(12) United States Patent
Hecker et al.

(10) Patent No.: US 11,433,866 B2
(45) Date of Patent: *Sep. 6, 2022

(54) ELECTROPNEUMATIC EQUIPMENT OF A VEHICLE

(71) Applicant: Knorr-Bremse Systeme Fuer Nutzfahrzeuge GmbH, Munich (DE)

(72) Inventors: Falk Hecker, Markgroeningen (DE); Oliver Jundt, Hessigheim (DE); Michael Herges, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 49 days.

This patent is subject to a terminal disclaimer.

(21) Appl. No.: 16/969,961

(22) PCT Filed: Jan. 29, 2019

(86) PCT No.: PCT/EP2019/052049
§ 371 (c)(1),
(2) Date: Aug. 13, 2020

(87) PCT Pub. No.: WO2019/158351
PCT Pub. Date: Aug. 22, 2019

(65) Prior Publication Data
US 2020/0406879 A1  Dec. 31, 2020

(30) Foreign Application Priority Data
Feb. 19, 2018 (DE) .......................... 102018103605.1

(51) Int. Cl.
*B60T 13/68* (2006.01)
*B60T 13/66* (2006.01)
(Continued)

(52) U.S. Cl.
CPC .......... *B60T 13/683* (2013.01); *B60T 13/662* (2013.01); *B60T 8/327* (2013.01); *B60T 15/027* (2013.01);
(Continued)

(58) Field of Classification Search
CPC ...... B60T 13/683; B60T 8/327; B60T 13/662; B60T 15/027; B60T 2270/402; B60T 2270/403
See application file for complete search history.

(56) References Cited

U.S. PATENT DOCUMENTS 10,654,458 B2 * 5/2020 Witte .................... B60T 15/027

FOREIGN PATENT DOCUMENTS

CN 106458195 A 2/2017
DE 102015206572 A1 11/2015
(Continued)

OTHER PUBLICATIONS

Translation of European Patent No. EP 2090481 obtained from website: https://worldwide.espacenet.com on Apr. 13, 2022.*

(Continued)

*Primary Examiner* — Pamela Rodriguez
(74) *Attorney, Agent, or Firm* — Norton Rose Fulbright US LLP; Gerard Messina

(57) ABSTRACT

The invention relates to electropneumatic equipment (1) of a vehicle comprising an electropneumatic parking brake device (2) having an electropneumatic parking brake control unit (EPB). According to the invention, the electropneumatic parking brake control unit (EPB) is supplied with electric energy by only two electric energy sources 52,54) which are independent of each other, a first electric energy source (52) and a second electric energy source (54).

31 Claims, 12 Drawing Sheets

(51) Int. Cl.
*B60T 8/32* (2006.01)
*B60T 15/02* (2006.01)

(52) U.S. Cl.
CPC ... *B60T 2270/402* (2013.01); *B60T 2270/413* (2013.01)

(56) References Cited

FOREIGN PATENT DOCUMENTS

| DE | 102015114176 B3 | | 7/2016 |
|---|---|---|---|
| EP | 2090481 A2 | | 8/2009 |
| JP | 2010523384 A | * | 7/2010 |
| WO | 2004098967 A2 | | 11/2004 |
| WO | 2015154787 A1 | | 10/2015 |
| WO | 2016116241 A1 | | 7/2016 |

OTHER PUBLICATIONS

International Search Report dated Jun. 21, 2019 in connection with PCT/EP2019/052049.

* cited by examiner

ELECTROPNEUMATIC EQUIPMENT OF A VEHICLE

FIELD OF THE INVENTION

The invention relates to electropneumatic equipment of a vehicle and a vehicle having such electropneumatic equipment.

BACKGROUND INFORMATION

Such electropneumatic equipment of a vehicle is discussed, for example, in WO 2015154787 A1.

In the case of automated driving, the vehicle control has to continue to function even upon the occurrence of a fault, and has to do so until a safe state is reached. The safe state can be achieved either by driver takeover, or by parking (emergency braking) of the vehicle at a standstill and maintaining the parked state. For automation levels 4 and 5, the driver takeover is not acceptable, i.e., the autonomous system itself has to achieve the safe state automatically without driver intervention here.

In case of fault, this can mean that the autonomous system still has to maintain the driving task in spite of a fault for several minutes, i.e., the electronic activation of the brake has to function over several minutes even in the event of failure of the main brake control unit. Subsequently thereto, the vehicle has to be able to be safely parked, i.e., the parking brake or emergency brake also has to reliably function. In addition, it is to be noted that in the case of a longer driving duration in a backup state, a further fault could occur, so that a second fallback level is desirable.

SUMMARY OF THE INVENTION

The invention is accordingly based on the object of refining an electropneumatic device of a vehicle in such a way that it provides the highest possible level of failsafe performance with low structural expenditure. A vehicle having such an electropneumatic device is also to be provided.

This object may be achieved according to the invention by the features as described herein.

The invention is directed to electropneumatic equipment of a vehicle including a) an electropneumatic parking brake device having an electropneumatic parking brake control device, at least one compressed air supply, and at least one pneumatic spring-type brake cylinder, wherein b) the electropneumatic parking brake control device has an electronic parking brake control unit, a first valve device comprising at least one first solenoid valve and at least one valve pressure controlled thereby, in which the at least one first solenoid valve is controlled by the electronic parking brake control unit, wherein c) a pneumatic control input of the pressure-controlled valve is connected to the at least one first solenoid valve and a working output of the pressure-controlled valve can be connected to the at least one spring-type brake cylinder, and wherein d) the at least one first solenoid valve is furthermore connected to the at least one compressed air supply and to a pressure sink, wherein e) the at least one first solenoid valve is configured such that in dependence on the control by the electronic parking brake control unit, it connects the pneumatic control input of the pressure-controlled valve to the at least one compressed air supply or to the pressure sink, or in particular blocks such a connection in the deenergized state, and wherein f) the pressure-controlled valve is configured such that in the event of a deaeration of its pneumatic control input, it deaerates its working output and in the event of an aeration of its pneumatic control input it aerates its working output, and g) including at least one second valve device having a second solenoid valve, which is connected to the pneumatic control input of the pressure-controlled valve of the first valve device and is configured such that in dependence on energizing or deenergizing of the at least one second solenoid valve, it connects the pneumatic control input of the pressure-controlled valve to a further pressure sink or blocks such a connection.

The invention provides that h) the electropneumatic parking brake control device is supplied with electrical energy by only two electrical energy sources independent of one another, a first electrical energy source and a second electrical energy source, and that i) the at least one second solenoid valve of the second valve device can be energized or deenergized by only the two electrical energy sources independent of one another or by at least two electronic control units independent of one another, of which a first electronic control unit and a second electronic control unit is supplied with electrical energy by a respective other electrical energy source of the only two electrical energy sources independent of one another.

In other words, only two energy sources independent of one another are provided, which either permanently and directly energize the at least one second solenoid valve of the second valve device in the case of intact energy sources or deenergize it in the event of a failure of one electrical energy source of the only two energy sources or in the event of a failure of both energy sources. In this case, an interconnection of the at least one second solenoid valve of the second valve device to the two electrical energy sources can be provided such that a deenergization of the at least one second solenoid valve in terms of an "AND" circuit only takes place if both electrical energy sources have failed.

Alternatively, the at least one second solenoid valve of the second valve device is controlled by the two electronic control units by energizing or deenergizing, for example, in terms of an "OR" circuit, wherein the two electronic control units are each supplied with electrical energy by one of the energy sources independent of one another.

Because a pneumatic control input of the pressure-controlled valve is connected to the at least one first solenoid valve and a working output of the pressure-controlled valve can be connected to the at least one spring-type brake cylinder, by aerating or deaerating the pneumatic control input of the pressure-controlled valve, a release or application of the at least one spring-type brake cylinder can be induced in principle.

Because the at least one second solenoid valve of the second valve device is connected to the pneumatic control input of the pressure-controlled valve of the first valve device and the second valve device is configured such that, in dependence on an energization or deenergization of the at least one second solenoid valve, it connects the pneumatic control input of the pressure-controlled valve to the further pressure sink or blocks such a connection, in the most unfavorable case, that both electrical energy sources fail (for example, in chronological succession), it can nonetheless be ensured that the parking brake is automatically applied via the pneumatic control input of the pressure-controlled valve of the first control device, which is then deaerated by the deenergized second valve device, and the vehicle is thus put into a safe parking state. This automatically occurring functionality of the application of the at least one spring-type brake cylinder in the event of a failure of both electrical energy sources can take place during travel or also at a standstill and is only dependent on the times of the occurrence of the failures of the two electrical energy supplies.

Because in particular in utility vehicles, including tractor-trailer combinations and also rail vehicles, parking brakes (also called emergency brakes) are generally equipped with spring-type brake cylinders, which apply compressed air to a brake chamber in the release position and thus keep an accumulator spring tensioned, while the brake chamber is deaerated, i.e., connected to atmospheric pressure for braking, so that the spring-type brake cylinder generates a brake force under the action of the accumulator spring, deaerating the brake chamber ensures a safe parking state of the vehicle as a result of the action of the accumulator spring. The deaerating of the brake chamber can be automatically induced as described above by the second valve device if, for example, both electrical energy sources fail (for example, in chronological succession).

In general, however, an automatic application of the spring-type brakes during travel of the vehicle should represent a safety measure to be used last, in order to avoid rear-end collisions and unstable driving behavior.

It is therefore provided in the context of a control logic implemented in at least one electronic control unit that application of the parking brake may only take place at a standstill of the vehicle, for example, if only one of the two electrical energy sources has failed. This is because the standstill of the vehicle can then be detected with the aid of the intact remaining electrical energy source and the parking brake can be controlled to the application state using the still available electrical energy by the electropneumatic parking brake control unit only when a vehicle standstill has been detected.

In addition to the electropneumatic parking brake control device, the two electrical energy sources independent of one another can additionally also each supply a service brake circuit of a, for example, electropneumatic service brake device of the vehicle with electrical energy and optionally directly and permanently energize the at least one second solenoid valve of the second valve device. Therefore, only two electrical energy sources independent of one another are provided for this purpose and are also sufficient, wherein in the event of a failure of both electrical energy sources as described above, a safer state of the vehicle is enabled by permanently applying the spring-type brake.

Electrical energy sources independent of one another therefore means that a failure of one of the electrical energy sources cannot influence the functionality of the respective other electrical energy source. This also applies to the electronic control units ECU1 and ECU2 independent of one another.

The invention therefore has the advantage that without the necessity of a third electrical energy supply, it can always provide a redundancy in the cases in which a failure of one or both electrical energy source(s) and/or one electronic control unit or both electronic control units takes place. Furthermore, the invention is also implementable inexpensively, because only routine components such as solenoid valves are used.

The invention is therefore suitable in particular for use for highly automated driving, in particular in level 4 and 5, because it provides redundancies which can be carried out automatically without intervention of the driver. The invention is not restricted to an application in the context of automated driving, however. Rather, it can also be applied to operation of the vehicle carried out by the driver.

Advantageous refinements and improvements of the invention specified in claim 1 are possible by way of the measures listed in the dependent claims.

As shown in FIG. 1a, FIG. 1b, and FIG. 9, the only two electrical energy sources independent of one another may each supply one electronic control unit ECU1 or ECU2, respectively, with electrical energy, namely a first electrical energy source supplies the first electronic control unit ECU1 and a second electrical energy source the second electronic control unit ECU2.

According to the embodiments shown in FIG. 1a, FIG. 1b, and FIG. 9, the first electronic control unit ECU1' and the second electronic control unit ECU2 are each configured such that a failure of one of the electronic control units ECU1 or ECU2 does not influence the functionality of the respective other electronic control unit ECU2 or ECU1.

Various malfunctions are now conceivable in which one component or assembly of the electropneumatic equipment fails and then a redundancy is provided by the invention, also without the driver or an additionally provided autopilot device having to intervene.

For example, first means for detecting a failure of the electronic parking brake control unit EPB-ECU and second means for detecting a travel state of the vehicle with respect to travel or standstill can be provided, wherein the first means and the second means are supplied with electrical energy by at least one electrical energy source of the two energy sources independent of one another.

For reliable management of a first malfunction, for example, a control logic implemented in at least one electronic control unit can be provided, which receives signals from the first means and the second means and which is configured in such a way that in the event of a detected standstill of the vehicle and in the event of a detected failure of the electronic parking brake control unit EPB-ECU, it controls the first electronic control unit ECU1 and/or the second electronic control unit ECU2 in such a way that it (they) control/controls the at least one second solenoid valve of the second valve device to connect the pneumatic control input of the pressure-controlled valve of the parking brake control device to the further pressure sink.

In the event of an occurrence of this first malfunction (failure of the electronic parking brake control unit EPB-ECU), the vehicle can then be braked to a standstill automatically or by the driver, for example, with the aid of an intact service brake circuit, and then the parking brake, when the standstill of the vehicle has been detected, can be automatically applied with the aid of an electrical control of the at least one second solenoid valve of the second valve device by one of the electronic control units ECU1 or ECU2 or by both electronic control units ECU1 and ECU2.

Furthermore, in addition to the first means for detecting a failure of the electronic parking brake control unit EPB-ECU, the second means for detecting a travel state of the vehicle with respect to travel or standstill, third means can also be provided for detecting a failure of the first electronic control unit ECU1 and/or the second electronic control unit ECU2, wherein the first means, the second means, and the third means are supplied, for example, with electrical energy by at least one electrical energy source of the two energy sources independent of one another.

For reliable management of a second malfunction, for example, a control logic implemented in at least one electronic control unit supplied with electrical energy by at least one electrical energy source of the two energy sources independent of one another can be provided, which receives signals from the first means, from the second means, and from the third means and which is configured in such a way that in the event of a detected standstill of the vehicle and in the event of a detected failure, on the one hand, of the first electronic control unit ECU1 or the second electronic control unit ECU2 and, on the other hand, the electronic parking brake control unit EPB-ECU, it controls the respective intact remaining electronic control unit ECU1 or ECU2 of the two electronic control units ECU1, ECU2 in such a way that this intact remaining electronic control unit ECU1 or ECU2 controls the at least one second solenoid valve of the second valve device to connect the pneumatic control input of the pressure-controlled valve to the further pressure sink.

This second malfunction therefore relates, for example, to a failure of the (main) service brake circuit as a result of the failure, for example, of the first electronic control unit ECU1, which controls this service brake circuit and, for example, a chronologically successive failure of the electronic parking brake control unit EPB-ECU. The vehicle can then be braked to a standstill automatically or by the driver, for example, via the still intact second electronic control unit ECU2, which controls a redundant service brake circuit, and after detected standstill of the vehicle, the parking brake can then be automatically applied with the aid of the electrical control of the at least one second solenoid valve of the second valve device by the still intact second electronic control unit ECU2.

In a chronologically inverted manner, the second malfunction can also firstly be formed by the failure of the electronic parking brake control unit EPB-ECU and then in chronological succession by the failure of the (main) service brake circuit, wherein the control logic reacts in a similar manner.

FIG. 1a, FIG. 1b, FIG. 3a, FIG. 3b, and also FIG. 5 show still a third valve device having at least one third solenoid valve controlled by the electronic parking brake control unit EPB-ECU, which is connected to the working output of the pressure-controlled valve, to at least one compressed air supply, and to the at least one spring-type brake cylinder and is configured such that in the event of deenergization of the at least one third solenoid valve by the electronic parking brake control unit, it connects the at least one spring-type brake cylinder to the working output of the pressure-controlled valve and in the event of energization of the at least one third solenoid valve by the electronic parking brake control unit EPB-ECU, it blocks such a connection and then connects the at least one spring-type brake cylinder to the at least one compressed air supply.

With the aid of this third valve device, an application of the at least one spring-type brake cylinder triggered by the second valve device can be prevented or overwritten, as described in greater detail below.

According to FIG. 1a, FIG. 1b, FIG. 7, and FIG. 9, a fourth valve device having at least one fourth solenoid valve controlled by the electronic parking brake control unit EPB-ECU can also be provided, which is connected to a pneumatic control fitting of an electropneumatic trailer control module TCM, to at least one compressed air supply, and to the working output of the pressure-controlled valve RV and is configured such that in the event of deenergization of the at least one fourth solenoid valve by the electronic parking brake control unit EPB-ECU, it establishes a connection between the pneumatic control fitting of the electropneumatic trailer control module TCM and the working output of the pressure-controlled valve and in the event of energization of the at least one fourth solenoid valve, it blocks such a connection and establishes a connection between the at least one compressed air supply and the pneumatic control fitting of the electropneumatic trailer control module TCM.

As shown in FIG. 1a, FIG. 1b, FIG. 7, FIG. 9, and FIG. 11, the electropneumatic trailer control module TCM has a pneumatic fitting for a pneumatic or electropneumatic brake device of a trailer of the vehicle (tractor vehicle) and is configured such that in the event of aeration of its pneumatic control fitting, it deaerates the pneumatic fitting, whereby the trailer brakes are released, and in the event of deaeration of its pneumatic control fitting, it aerates the pneumatic control fitting, whereby the trailer brakes are applied. The trailer control module TCM thus has a pneumatically inverting effect.

According to FIG. 1a, FIG. 1b, FIG. 7, FIG. 9, and FIG. 11, the at least one fourth solenoid valve may be formed by a test solenoid valve which is provided for a test as to whether the tractor vehicle braked via the at least one spring-type brake cylinder can hold a combination of the tractor vehicle and a trailer at a standstill with unbraked trailer. A test solenoid valve of the electropneumatic parking brake control device, which is usually already provided, can then advantageously be used to implement application of the trailer brakes in case of a malfunction as described in greater detail below.

As shown by way of example in FIG. 3a, FIG. 3b, FIG. 4a, FIG. 4b, FIG. 5, and FIG. 7, the at least one third solenoid valve and/or the at least one fourth solenoid valve can each be formed by at least one of the following valves or can include at least one such valve:
a) a 3/2-way solenoid valve,
b) a 2/2-way solenoid valve,
c) a combination of a 2/2-way solenoid valve and a select high valve.

In some vehicles, an excess flow shutoff valve is already provided, which is to prevent the spring-type brake cylinders from automatically being applied in the event of a broken compressed air line to the spring-type brake cylinder, which could result in undesired locking of the wheels (FIG. 9). This excess flow shutoff valve may consists of a 3/2-way valve, which acts in parallel on the spring-type brake cylinder by means of a select high valve at the input of the spring-type brake cylinder and then supplies it with supply pressure. This excess flow shutoff valve (for example, as a 3/2-way solenoid valve) in combination with the select high valve can then take over the function of the third valve device (FIG. 10a, FIG. 10b).

In particular, in general 3/2-way valves and/or 2/2-way valves can also be used in combination with at least one further valve for the first valve device, the second valve device, the third valve device, and the fourth valve device. The valves can also be electrically pilot controlled. Therefore, inexpensive electrical pilot control valves can be used, which pneumatically control pneumatic valves having relatively large flow cross sections.

Furthermore, fourth means can be provided for detecting a failure of the first electrical energy accumulator and/or the second electrical energy accumulator. If the first electrical energy accumulator and/or the second electrical energy accumulator then can no longer supply electric current, this is necessarily accompanied by a deenergization of the respective connected consumer, for example, of solenoid valves, which then automatically switch over in a spring-loaded manner, for example, which represents a fault signal or malfunction signal of these fourth means, so that the fourth means can also be formed by the first electrical energy accumulator and/or the second electrical energy accumulator themselves.

For a reliable management of a third malfunction, for example, a control logic implemented in at least one electronic control unit supplied with electrical energy by at least one electrical energy source of the two energy sources independent of one another can then be provided, which receives signals from the fourth means and which is configured in such a way that in the event of a detected failure of a single electrical energy source of the two electrical energy sources independent of one another, it controls the electronic parking brake control unit EPB-ECU in such a way that the at least one third solenoid valve of the third valve device is energized.

This third malfunction then relates, for example, firstly to a failure of one of the two electrical energy sources and chronologically subsequently thereto a failure of also the other electrical energy source in addition.

The vehicle can then still continue its travel with initially only one failed electrical energy source and can also still perform braking automatically or initiated by the driver using a service brake circuit supplied by the intact remaining electrical energy source. In this case, the electropneumatic parking brake control device or its electronic parking brake control unit EPB-ECU already pre-switches into the state "apply parking brake" i.e., the working outlet of its pressure-controlled valve is deaerated. The application of the at least one spring-type brake cylinder is (still) prevented by means of energization of the third solenoid valve of the third valve device, however, which then as described above blocks the working output of the pressure-controlled valve with respect to the at least one spring-type brake cylinder and connects the latter to the at least one compressed air supply and thus aerates it. Finally, the parking brake is thus already prepared for the case that the other electrical energy source also fails.

If the vehicle then acting as a tractor vehicle is equipped with a trailer control module and thus can pull and decelerate a trailer, the control logic can furthermore be configured such that in the event of a detected failure of a single electrical energy source of the two electrical energy sources independent of one another, it controls the electronic parking brake control unit EPB-ECU in such a way that the at least one fourth solenoid valve of the fourth valve device is energized. This has the effect, as also described above, that the pneumatic control input of the trailer control module is aerated, which means, against the background of the pneumatic inversion of the pressure relationships within such a trailer control module, that the trailer brakes are deaerated and thus also their application is (initially) prevented.

If now, in continuation of the third malfunction, after some time the other remaining electrical energy source of the only two energy sources independent of one another should also fail, the electropneumatic parking brake control device or the electronic parking brake control unit and also the at least one third solenoid valve of the third valve device are thus necessarily deenergized, whereupon the deenergized at least one third solenoid valve of the third valve device connects the at least one spring-type brake cylinder to the working outlet of the pressure-controlled valve, whereupon the at least one spring-type brake cylinder is deaerated and the parking brake is automatically applied.

If the vehicle is equipped as a tractor vehicle with a trailer control module, in the event of a failure, the other electrical energy source of the only two energy sources independent of one another will thus deenergize the at least one fourth solenoid valve of the fourth valve device, so that the pneumatic control input of the trailer control valve is thus deaerated and due to the pneumatic inversion within the trailer control module, the trailer brakes are aerated and are thus also automatically applied.

According to an embodiment shown in FIG. 1a, FIG. 1b, and FIG. 9, an above-described control logic can be implemented in each case in the electronic parking brake control unit EPB-ECU, the first electronic control unit ECU1, and the second electronic control unit ECU2. The functions of the control logic can thus also be executed if one or two of the electronic control units or their electrical energy supply fails (fail). Alternatively or additionally, the control logic can also be implemented in any other electronic control unit, for example, also in a control unit of the autopilot device.

As shown in FIG. 1a, FIG. 1b, FIG. 7, FIG. 9, and FIG. 11, the pressure-controlled valve of the electropneumatic parking brake control device can be formed by a relay valve, which is connected to a supply fitting on the at least one compressed air supply.

The relay valve typically firstly has a control chamber connected to the pneumatic control input, at least one relay piston, which is controlled by the pressure in the control chamber and actuates a double seat valve (inlet seat, outlet seat), and a working chamber connected to the working output, wherein the relay piston delimits the control chamber and the working chamber. The working chamber opens into the working fitting.

A pneumatic feedback connection may be drawn in this case between the working output of the relay valve and the pneumatic control input of the relay valve, in which at least one pneumatic throttle element may be arranged.

A bistability of the relay valve is produced by the feedback connection. In this case, the very inexpensive throttle element and, for example, two normally closed 2/2 solenoid valves as inlet/outlet valve combination within the first valve device of the electropneumatic parking brake control unit together functionally form a solenoid valve device having 3/3 function, in which in the deenergized state, for example, both 2/2 solenoid valves are located in their blocking position and thus the control chamber of the relay valve is blocked both with respect to the compressed air supply and also against atmosphere.

Therefore, for the purposes of the feedback, at least one throttle element can be arranged in the feedback connection drawn between the working output and the pneumatic control input of the relay valve, in such a way that the working output and the pneumatic control input of the relay valve always have a flow connection to one another. A feedback circuit results via the feedback connection provided with the at least one throttle element, in which the pressure at the working output of the relay valve or at the fitting for the at least one spring-type brake cylinder is fed back into the control input of the relay valve, whereby the last assumed state of the at least one spring-type brake cylinder, for example, its applied position, is stably locked.

A throttle element is to be understood here as an element which narrows the flow cross section of the feedback connection. The air mass flow between the working output and the pneumatic control input of the relay valve is limited here by the throttle element (in both flow directions) to a value which is, for example, less than the air mass flow which can be generated by means of the first valve device at the pneumatic control input of the relay valve. On the one hand, the desired feedback is thus always provided, on the other hand, however, an override of the feedback by the first valve device is possible.

Except for the at least one throttle element, no further elements which obstruct or block the air mass flow between the working output and the pneumatic control input of the relay valve such as switching valves, proportional valves, pressure limiting valves, etc. need be arranged in the feedback connection.

The second valve device may contain at least one electrically controlled 2/2-way valve, which
a) as shown in FIG. 2, when energized, assumes a passage position, in which a first fitting is connected to a second fitting and which assumes a blocking position (normally closed) when deenergized, in which this connection is blocked, or which
b) as shown in FIG. 6, FIG. 8, and FIG. 12, when deenergized, assumes a passage position (normally open), in which a first fitting is connected to a second fitting, and which assumes a blocking position when energized, in which this connection is blocked.

The above embodiment a) of the electrically controlled 2/2-way valve of the second valve device as a normally closed valve may relate to the case of FIG. 2, in which the at least one 2/2-way valve is electrically controlled by the two electronic control units in terms of an "OR" switch, i.e., each of the two electronic control units can electrically control the at least one 2/2-way valve independently.

The above embodiment b) of the at least one electrically controlled 2/2-way valve of the second valve device as a normally open valve may relate to the case of FIG. 8 and FIG. 12, in which the at least one 2/2-way valve is electrically controlled by the two electrical energy sources in terms of an "AND" circuit, i.e., the at least one 2/2-way valve is switched into its passage position solely in the event of the failure of both electrical energy supplies, in order to connect the pneumatic control input of the pressure-controlled valve to the further pressure sink and thus to deaerate the at least one spring-type brake cylinder. On the other hand, the above embodiment b) of the at least one electrically controlled 2/2-way valve of the second valve device as a normally open valve also relates to the case of FIG. 6, however, in which the at least one 2/2-way valve is controlled by the two electrical energy sources in terms of an "OR" circuit, i.e., in the event of a failure of one of the two electrical energy supplies, the at least one 2/2-way valve is switched into its passage position to connect the pneumatic control input of the pressure-controlled valve to the further pressure sink and thus to deaerate the at least one spring-type brake cylinder.

FIG. 2 shows an embodiment in which the second valve device contains a single electrically controlled 2/2-way valve, of which a first fitting is connected to the pneumatic control input of the pressure-controlled valve (RV) and a second fitting is connected to the further pressure sink and which is controlled by the first electronic control unit ECU1 and, independently thereof, by the second electronic control unit ECU2.

As shown in FIG. 6, FIG. 8, and FIG. 12, the second valve device can include two electrically controlled 2/2-way valves or one single 2/2-way solenoid valve having two coils, wherein
a) a first 2/2-way valve or a first coil of the single 2/2-way solenoid valve is energized by the first energy source and a second 2/2-way valve or a second coil of the single 2/2-way solenoid valve is energized by the second energy source, and wherein b) the single 2/2-way solenoid valve or the first 2/2-way valve and the second 2/2-way valve is (are) interconnected with the pneumatic control input of the pressure-controlled valve and with the further pressure sink in such a way that the pneumatic control input of the pressure-controlled valve is only connected to the further pressure sink in the event of a failure of both electrical energy sources and otherwise, i.e., in the event of a failure of only one of the two electrical energy sources independent of one another or in the event of both intact electrical energy sources independent of one another, such a connection is blocked.

FIG. 11 and FIG. 12 show an embodiment in which the second valve device includes at least one electrically controlled 2/2-way valve, which assumes a passage position when deenergized (normally open), in which a first fitting is connected to a second fitting, and which assumes a blocking position when energized, in which this connection is blocked, wherein furthermore a bistable valve is provided as a 2/2-way solenoid valve controlled by the electronic parking brake control unit EPB-ECU, which is energized by the two electrical energy sources. The electrically controlled 2/2-way valve of the second valve device is continuously energized, for example, in operation of the two electrical energy sources, so that it is closed during travel in the error-free case. The bistable valve may be controlled by the electronic parking brake control unit of the electropneumatic parking brake device. The electronic parking brake control unit can then select whether the parking brake is automatically engaged in the event of power failure. The bistability can be implemented, for example, via a booster valve having feedback, which switches in the direction of closed when depressurized.

In the embodiments of FIG. 1a, FIG. 1b, FIG. 7, FIG. 9, and FIG. 11, the at least one first solenoid valve of the first valve device is formed, for example, by a combination of two 2/2-way solenoid valves as an inlet/outlet valve combination.

In general, the first electronic control unit ECU1 and the second electronic control unit ECU2, as shown in FIG. 1a, FIG. 1b, FIG. 7, FIG. 9, and FIG. 11, can each be formed by one of the following electronic control units:
a) an electronic control unit EBS-ECU, which controls or regulates an electronically regulated electropneumatic service brake system EBS of the vehicle,
b) an electronic control unit iFBM-ECU, which, on the one hand, represents an evaluation device for signals of a brake value generator of an electropneumatic foot brake module interacting with a brake pedal and which, on the other hand, controls a solenoid valve device, by which a pneumatic control chamber of the electropneumatic foot brake module is aerated or deaerated, using which at least one pneumatic channel of the foot brake module is actuatable,
c) an electronic control unit steer-ECU, which controls an electrical steering device of the vehicle,
d) an electronic control unit ACC-ECU, which controls a driver assistance system of the vehicle,
e) an electronic control unit autopilot-ECU, which controls an autopilot device of the vehicle, using which partially autonomous or autonomous driving is implemented,
f) an electronic control unit EAC-ECU, which controls a compressed air preparation device for compressed air consumers of the vehicle,
g) an electronic control unit ASC-ECU, which controls a pneumatic suspension device of the vehicle,
h) an electronic control unit central-ECU, which forms a central vehicle computer of the vehicle.

According to one refinement a) the first means for detecting a failure of the electronic parking brake control unit EPB-ECU, and/or
b) the third means for detecting a failure of the first electronic control unit ECU1 and/or the second electronic control unit ECU2, and/or
c) the fourth means for detecting a failure of the first electrical energy accumulator and/or the second electrical energy accumulator can include a detection by self-monitoring or a detection by external monitoring (for example, by another electronic control unit).

According to the embodiments shown in FIG. 1a, FIG. 1b, FIG. 7, and FIG. 9, the at least one parking brake control unit, the first valve device including the at least one first solenoid valve, and the pressure-controlled valve can be integrated in a common housing of the parking brake control device.

As the embodiment of FIG. 1b shows, the at least one second solenoid valve, the at least one third solenoid valve, and/or the at least one fourth solenoid valve can be integrated into the housing of the parking brake control device or flanged onto the housing of the parking brake control device.

As can be seen in particular from FIG. 1a, FIG. 1b, FIG. 7, and FIG. 9, the first electrical energy source and the second electrical energy source can each be decoupled from one another by circuit disconnection diodes and/or by fuses connected in series thereto and/or by relays.

The electropneumatic equipment particularly may also include an electronically regulated electropneumatic service brake system (EBS), in which the service brake pressure is regulated to a target value.

In particular, the two electrical energy sources can each supply one electrical or electropneumatic service brake circuit with electrical energy.

The invention also comprises a vehicle having above-described electropneumatic equipment.

Further measures which improve the invention are explained in greater detail hereinafter together with the description of exemplary embodiments of the invention on the basis of the drawings.

DETAILED DESCRIPTION

Figure 1A:
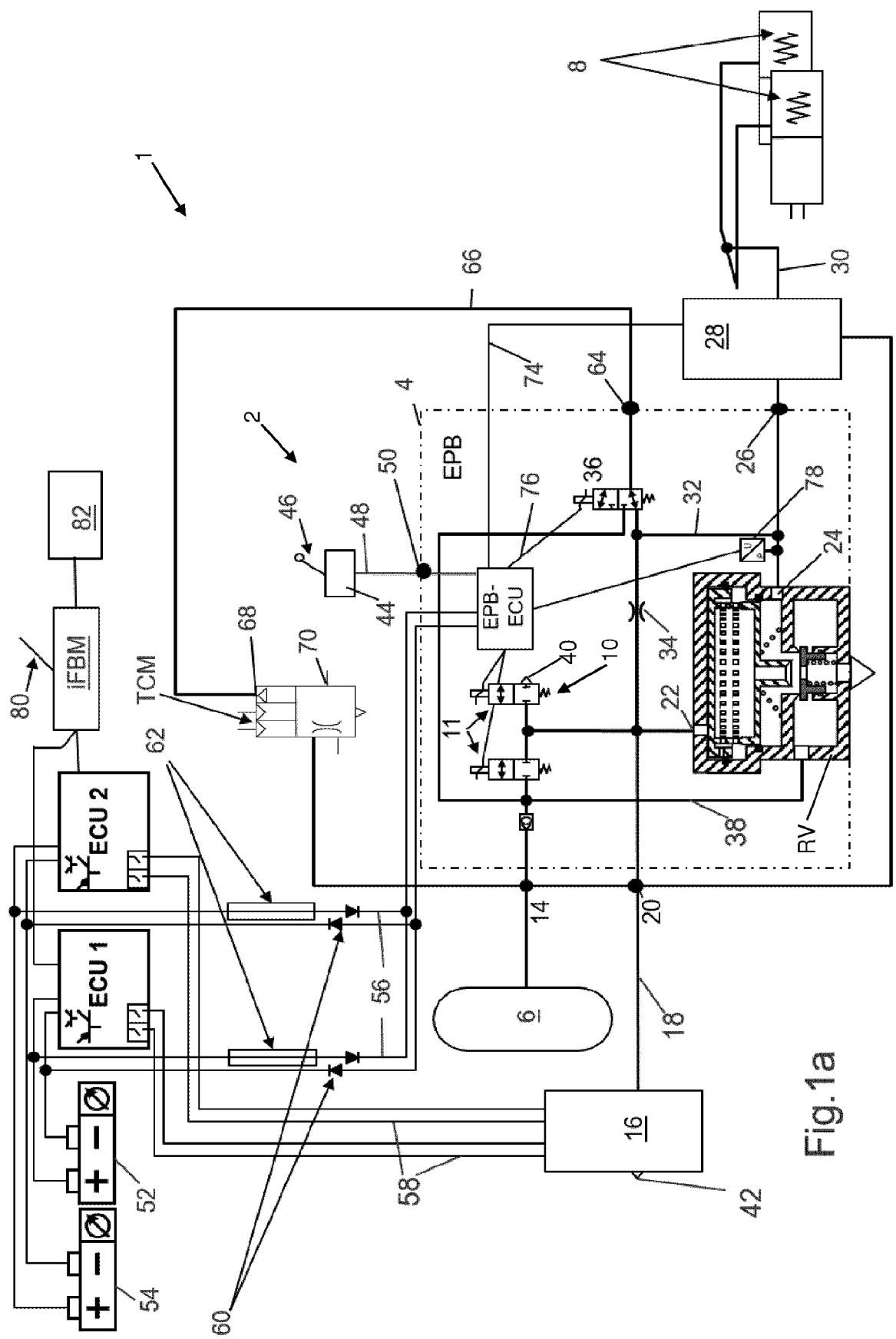
FIG. 1a shows a schematic circuit diagram of an exemplary embodiment of electropneumatic equipment of a vehicle according to the invention.

FIG. 1a shows a schematic circuit diagram of an exemplary embodiment of electropneumatic equipment 1 according to the invention. The electropneumatic equipment 1 may be part of a heavy utility vehicle as a tractor vehicle of a tractor-trailer combination and comprises an electropneumatic brake device made of an electropneumatic parking brake device 2 and an electropneumatic service brake device, which is here, for example, an electronically regulated service brake device (EBS) and is arranged on the tractor vehicle.

The electropneumatic parking brake device 2 comprises an electropneumatic parking brake control device EPB, which may have a separate housing 4, a compressed air supply 6, and a pneumatic spring-type brake cylinder 8. The electropneumatic parking brake control device EPB has an electronic parking brake control unit EPB-ECU and a first valve device 10, here made up of an inlet/outlet solenoid valve combination 11 and a relay valve RV pressure controlled thereby, in which the inlet/outlet solenoid valve combination 11 is electrically controlled by the electronic parking brake control unit EPB-ECU. The compressed air supply 6 is connected via a supply line 12 to a supply fitting 14 of the electropneumatic parking brake control device EPB.

A second valve device 16 is connected via a pneumatic control line 18 to a pneumatic control fitting 20 of the electropneumatic parking brake control device EPB.

A pneumatic control input 22 of the relay valve RV is connected to the inlet/outlet solenoid valve combination 11 to pneumatically control the relay valve RV. Furthermore, a working output 24 of the relay valve RV is connected to a working fitting 26 of the electropneumatic parking brake control device EPB, to which here, for example, the spring-type brake cylinders 8 can also be connected via a third valve device 28 in a pneumatic brake line 30.

In a typical manner, the relay valve RV firstly has a control chamber connected to the pneumatic control input 22, at least one relay piston controlled by the pressure in the control chamber and actuating a double seat valve (inlet seat, outlet seat), and a working chamber connected to the working output 24, wherein the relay piston delimits the control chamber and the working chamber. The working chamber can be deaerated via a pressure sink of the relay valve RV or connected to a supply fitting of the relay valve RV, which is connected to the supply fitting 14.

A pneumatic feedback connection 32, in which a pneumatic throttle element 34 may be arranged, may be drawn here between the working output 24 of the relay valve RV and the pneumatic control input 22 of the relay valve RV. The relay valve RV is in turn configured such that in the event of deaeration of its pneumatic control input 22, it deaerates its working output 24 and in the event of aeration of its pneumatic control input 22, it aerates its working output 24, in that it then conveys more compressed air from the supply fitting 14, to which it is connected.

In the electropneumatic parking brake control device EPB, the inlet/outlet solenoid valve combination 11, the relay valve RV, and a fourth valve device 36, here in the form of a test solenoid valve, are connected to the supply fitting 14 via an internal supply connection. Furthermore, the inlet/outlet solenoid valve combination 11 is connected to a first pressure sink 40.

The inlet/outlet solenoid valve combination 11 is configured such that in dependence on the control by the electronic parking brake control unit EPB-ECU, it connects the pneumatic control input 22 of the relay valve RV to the supply fitting 14 or to the first pressure sink 40 or respectively blocks such a connection.

The at least one second valve device 16 having a second solenoid valve is connected to the control fitting 20 and thus also to the pneumatic control input 22 of the relay valve RV of the first valve device 10 via the pneumatic control line 18. As can be seen from FIG. 2, the second valve device 16 is configured, for example, as a 2/2-way solenoid valve 16a, which, in dependence on energization or deenergization, connects its fitting, which is connected to the pneumatic control fitting 20 and thus to the pneumatic control input 22 of the relay valve RV, to a second pressure sink 42 or blocks such a connection.

The electronic parking brake control unit EPB-ECU is electrically controllable via a parking brake actuating device 44, which the driver can actuate via a parking brake actuating element 46 and can thus introduce parking brake actuating signals via a signal line 48 and a signal terminal 50 into the electronic parking brake control unit EPB-ECU to control the parking brake.

The electropneumatic parking brake control device EPB or its electronic parking brake control unit EPB-ECU is supplied with electrical energy via electrical supply lines 56 by only two electrical energy sources independent of one another, a first electrical energy source 52 and a second electrical energy source 54.

Furthermore, the 2/2-way solenoid valve 16a of the second valve device 16 is controlled by two electronic control units ECU1, ECU2 independent of one another by means of control lines (energizing or deenergizing), of which a first electronic control unit ECU1 and a second electronic control unit ECU2 is supplied with electrical energy by a respective other electrical energy source 52 or 54 of the only two electrical energy sources 52, 54 independent of one another.

Here, for example, the first electrical energy source 52 and the second electrical energy source 54 are each decoupled from one another by circuit disconnection diodes 60 and by fuses 62 connected in series thereto in the supply lines 56.

Furthermore, a trailer fitting 64 is also provided in the electropneumatic parking brake control device EPB, which is connected to the test solenoid valve 36 and which is connected, on the other hand, via a pneumatic line 66 to a pneumatic control input of a trailer control module TCM, which is provided for the control of the brake device of the trailer. The trailer control module TCM inverts the pressure at its pneumatic control input 68 at a working output 70, to which the pneumatic brake device of the trailer is connected. The trailer control module TCM is also supplied with compressed air from the compressed air supply 6 via a supply line 72.

Figure 2:
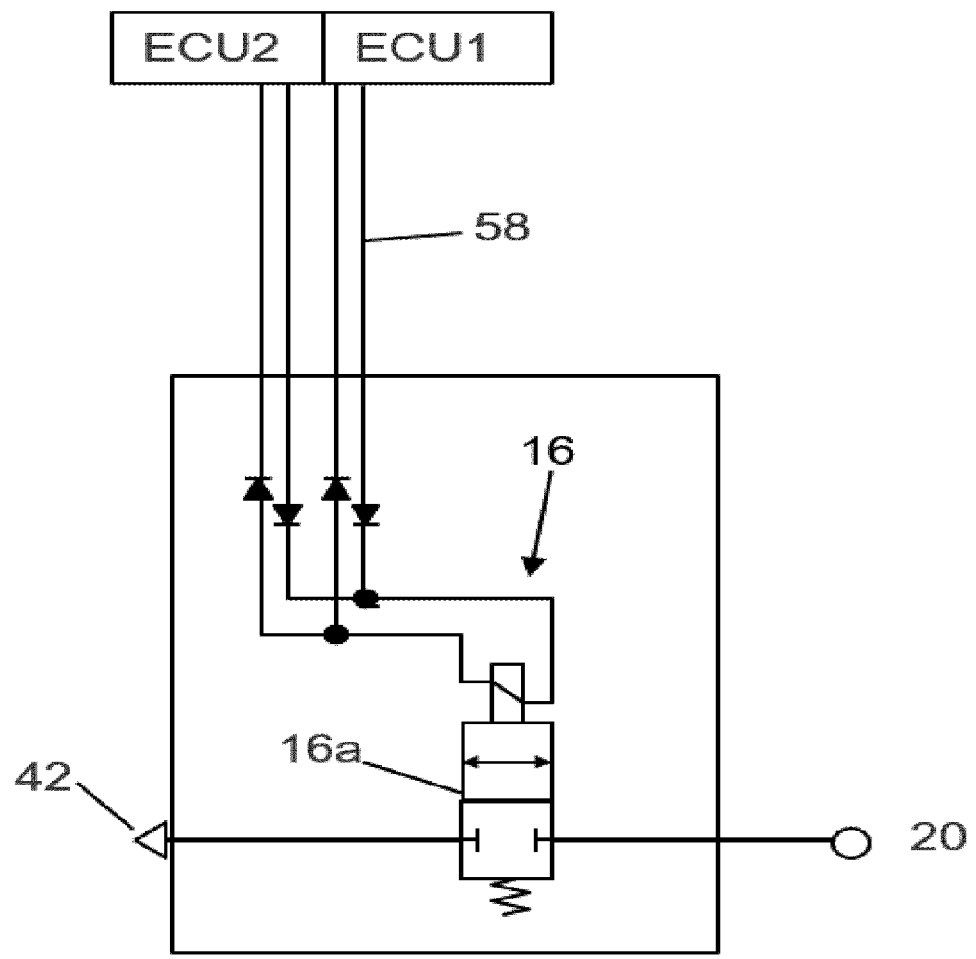
FIG. 2 shows a schematic circuit diagram of a second 2/2-way solenoid valve of a second valve device of the electropneumatic equipment of FIG. 1a or FIG. 1b.

The 2/2-way solenoid valve 16a shown in FIG. 2 as the second valve device 16 is electrically controlled, on the one hand, by the first electronic control unit ECU1 and, on the other hand, independently thereof also by the second electronic control unit ECU2. The 2/2-way solenoid valve 16a may be a normally closed solenoid valve which, when deenergized, blocks a connection between the pneumatic control fitting 20 of the electropneumatic parking brake control device EPB or the pneumatic control input 22 of the relay valve RV and the first pressure sink 40 and, when energized, releases this connection.

Figure 3A:
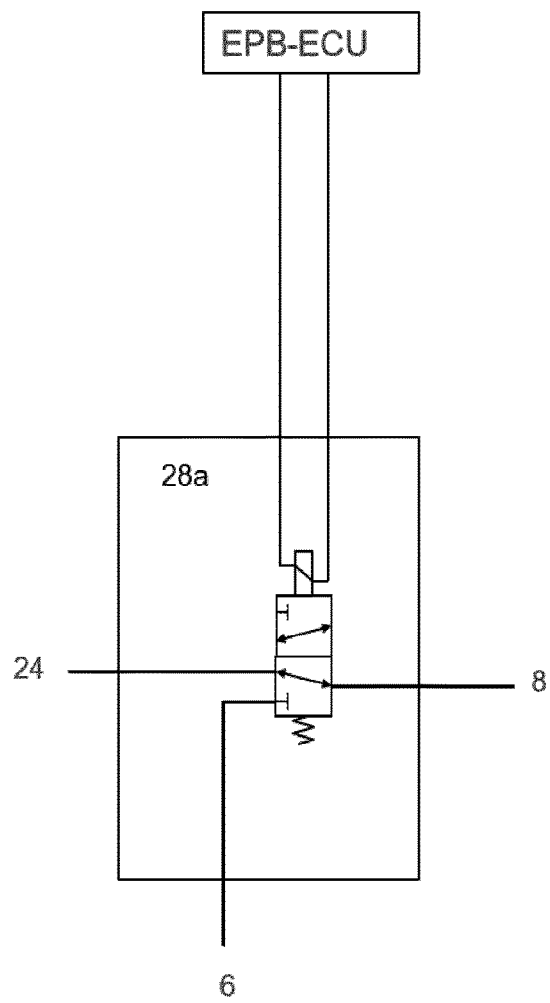
FIG. 3a shows a schematic circuit diagram of an exemplary embodiment of a third 3/2-way solenoid valve of a third valve device of the electropneumatic equipment of FIG. 1a or FIG. 1b.

The third valve device 28 is formed here, for example, by a 3/2-way solenoid valve 28a as shown in FIG. 3a, which is connected to the working fitting 26 and thus also to the working output 24 of the relay valve RV, via the supply line 72 to the compressed air supply 6 and to the spring-type brake cylinder 8. This 3/2-way solenoid valve 28a is configured such that in the event of deenergization by the electronic parking brake control unit EPB-ECU, it connects the spring-type brake cylinders 8 to the working fitting 26 or to the working output 24 of the relay valve RV and in the event of energization by the electronic parking brake control unit EPB-ECU, it blocks such a connection and then connects the spring-type brake cylinder 8 to the compressed air supply 6. The third valve device 28 or the 3/2-way solenoid valve 28a is controlled via a control line 74 by the electronic parking brake control unit EPB-ECU.

Figure 3B:
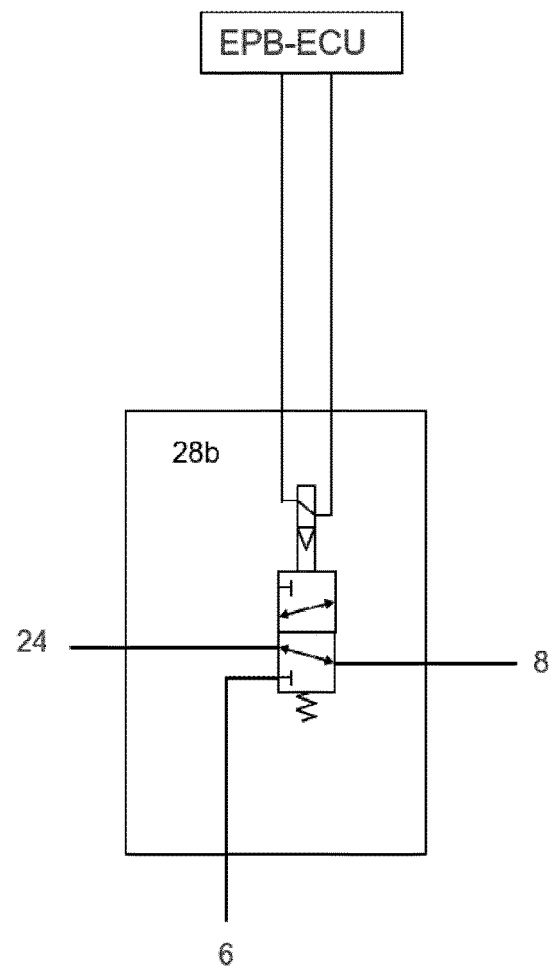
FIG. 3b shows a schematic circuit diagram of a further embodiment of a third 3/2-way valve of a third valve device of the electropneumatic equipment of FIG. 1a or FIG. 1b.

FIG. 3b shows as an alternative a pilot controlled 3/2-way valve 28b as the third valve device 28, which otherwise offers the same functionality as the 3/2-way solenoid valve 28a of FIG. 3a, however.

The test solenoid valve 36 as the fourth valve device is, for example, a 3/2-way solenoid valve here and is controlled by the electronic parking brake control unit (EPB-ECU) via a control line, which is connected, on the one hand, to the trailer fitting 64, via the supply connection 38 to the compressed air supply 6, and to the working output 24 of the relay valve RV. It is configured such that in the event of deenergization by the electronic parking brake control unit EPB-ECU, it establishes a connection between the trailer fitting 54 and the working output 24 of the relay valve RV and in the event of energization it blocks such a connection and then establishes a connection between the compressed air supply 6 and the trailer fitting 64 for the trailer control module (TCM), however.

The test solenoid valve 36 is (also) provided for a test as to whether the tractor vehicle braked via the spring-type brake cylinder 8 can keep a combination of the tractor vehicle and trailer at a standstill with unbraked trailer.

The test solenoid valve 36 is, the fourth valve device is, which may be like the inlet/outlet solenoid valve combination 11, the relay valve RV, the electronic parking brake control unit EPB-ECU, and a pressure sensor which measures the current pressure at the working output 24 of the relay valve RV and feeds back a corresponding signal into the electronic parking brake control unit EPB-ECU, is integrated into the housing 4 of the electropneumatic parking brake control device EPB.

The two electronic control units ECU1, ECU2 may be connected to a data bus and can communicate with one another and with other control units via the data bus, in particular signals which relate to a malfunction or a failure of one of the electronic control units ECU1 or ECU2 and then communicate this information to the respective other control unit ECU1, ECU2. External monitoring of the electronic control units ECU1, ECU2 among one another can thus be implemented here, but also self-monitoring is conceivable.

Furthermore, first means are provided for detecting a failure of the electronic parking brake control unit EPB-ECU, which are located in particular in the electronic parking brake control unit EPB-ECU and by way of which the electronic parking brake control unit EPB-ECU can carry out self-monitoring, for example. However, external monitoring by the two electronic control units ECU1 and ECU2 is also conceivable, which then form the first means. The electronic parking brake control unit EPB-ECU may be also connected to the data bus.

In addition, for example, second means for detecting a travel state of the vehicle with respect to travel or standstill are also provided, for example, in the form of wheel speed sensors on the wheels of the vehicle, which generate speed signals.

Not least, third means are also provided for detecting a failure of the first electronic control unit ECU1 and/or the second electronic control unit ECU2, which are located in particular in the first electronic control unit ECU1' and/or in the second electronic control unit ECU2 and by way of which the electronic control units ECU1 and ECU2 can each carry out self-monitoring as described above.

The first means, the second means, and the third means are supplied with electrical energy in this case by at least one electrical energy source 52, 54 of the two energy sources 52, 54 independent of one another.

Furthermore, for example, a control logic is implemented in each case in the two electronic control units ECU1, ECU2 and also in the electronic parking brake control unit EPB-ECU, by which the electronic parking brake control unit EPB-ECU electrically controls the first valve device 10, the third valve device 28, and the fourth valve device 36 and the two electronic control units ECU1, ECU2 electrically controls the second valve device 16.

The first electronic control unit ECU1 is, for example, an EBS-ECU, which controls or regulates a (main) service brake circuit of the electronically regulated electropneumatic service brake system EBS, while the second electronic control unit ECU2 represents, for example, on the one hand, an evaluation device for signals of a brake value generator of an electropneumatic foot brake module iFBM interacting with a brake pedal 80 and which, on the other hand, controls a solenoid valve device 82, by which a pneumatic control chamber of the electropneumatic foot brake module iFBM is aerated or deaerated, using which a pneumatic channel of the foot brake module iFBM is actuatable. The integrated brake value generator then generates electrical service brake request signals in dependence on actuation of the brake pedal 80 and introduces them, on the one hand, into the first electronic control unit ECU1 and also into the second electronic control unit ECU2.

The service brake request signals introduced into the first electronic control unit ECU1 and into the second electronic control unit ECU2 therefore may originate here from the foot brake module iFBM and are therefore dependent on the driver intention. Alternatively or additionally, the service brake request signals can also be generated by the autopilot device, by which (partially) autonomous driving of the vehicle is implemented.

This also applies to parking brake request signals introduced into the electronic parking brake control unit EPB-ECU, which can be generated by the parking brake actuating device 44 and/or by the autopilot device.

Against this background, the functionality of the electropneumatic equipment 1 is as follows:

In undisturbed operation, i.e., with functional electrical energy sources 52, 54 and functional electronic control units (parking brake control unit EPB-ECU, first electronic control unit ECU1, second electronic control unit ECU2), the service brake request signals generated by the foot brake module iFPM or also by the autopilot device are modified in the two electronic control units ECU1, ECU2 and implemented in the electropneumatic pressure regulating modules (not shown here), which then activate pneumatic service brake cylinders (also not shown here).

In a similar manner, parking brake request signals generated by the parking brake actuating device 44 and/or by the autopilot device, for example, in terms of "apply parking brake" are introduced into the intact parking brake control unit EPB-ECU, which thereupon activates the first valve device 10 to deaerate the control input 22 of the relay valve RV in accordance with the specification, whereupon the relay valve RV deaerates its working output 24 and thus also the working fitting 26 of the electropneumatic parking brake control device EPB to deaerate the spring-type brake cylinders 8 and thus apply them.

The 3/2-way solenoid valve 28a of the third valve device 28 is deenergized or not energized in this case by the electronic parking brake control unit EPB-ECU, whereby the spring-type brake cylinder 8 remains connected to the working output 24 of the relay valve RV.

Furthermore, the test solenoid valve 36 is kept deenergized by the electronic parking brake control unit EPB-ECU, so that, as shown in FIG. 1a, it connects the trailer fitting 64 to the deaerated working output 24 of the relay valve RV and thus also deaerates the pneumatic control input 68 of the trailer control module TCM, which, due to the pneumatic inversion, results in aeration and finally application of the trailer brakes.

In the intact case, the first electronic control unit ECU1' and the second electronic control unit ECU2 may energize the second valve device 16, for example, in the form of the 2/2-way solenoid valve 16a of FIG. 2, so that it assumes its blocking position and then does not deaerate the pneumatic control fitting 20.

In another case, the vehicle is decelerated to a standstill with the aid of an intact service brake circuit, wherein then the control logic receives a signal from the first means in the form of the wheel speed sensors that the vehicle is also actually at a standstill. If then in the context of a first malfunction of the second means, a failure of the electronic parking brake control unit EPB-ECU, for example, as a result of its self-monitoring, should then be detected, a corresponding fault signal ("parking brake control unit EPB-ECU defective") is thus sent according to the control logic via the data bus to the first electronic control unit ECU1' and the second electronic control unit ECU2, whereupon they deenergize the second valve device 16, for example, in the form of the 2/2-way solenoid valve 16*a* of FIG. 2, in order to connect the pneumatic control input 22 of the relay valve RV of the parking brake control device EPB to the second pressure sink 42, whereby the pneumatic control input 22 of the relay valve RV and thus also its working output 24 and the working fitting 26 are deaerated.

Since the parking brake control unit EPB-ECU is defective, the third valve device 28, for example, in the form of the 3/2-way solenoid valve 28*a* of FIG. 3*a*, also remains deenergized, whereby the spring-type brake cylinders 8 remain connected to the deaerated working output 24 of the relay valve RV and can thus be applied.

Furthermore, the test solenoid valve 36 controlled by the now defective electronic parking brake control unit EPB-ECU also necessarily remains deenergized, so that as shown in FIG. 1*a*, it connects the trailer fitting 64 to the deaerated working output 24 of the relay valve RV and thus also deaerates the pneumatic control input 68 of the trailer control module TCM, which, due to the pneumatic inversion, results in aeration and finally in application of the trailer brakes.

In a further case, the vehicle is decelerated to a standstill with the aid of an intact service brake circuit, wherein then the control logic receives a signal from the first means in the form of the wheel speed sensors that the vehicle is also actually at a standstill. If then, in the context of a second malfunction of the second means, a failure of the electronic parking brake control unit EPB-ECU, for example, as a result of its self-monitoring, should then be detected, a corresponding fault signal ("parking brake control unit EPB-ECU defective") is thus sent via the data bus to the first electronic control unit ECU1 and the second electronic control unit ECU2. The second malfunction thus initially does not differ from the first malfunction.

If, in addition, the third means report, for example, a chronologically following failure, for example, of the first electronic control unit ECU1, for example, as a result of its self-monitoring to the second electronic control unit ECU2, this thus means that the first electronic control unit ECU1 now can no longer energize the second valve device 16, for example, in the form of the 2/2-way solenoid valve 16*a* of FIG. 2, in order to hold it in the blocking position. (Temporary) energization of the second valve device 16 is, however, (initially) still performed by the intact remaining second electronic control unit ECU2.

As a result of the error message of the first electronic control unit ECU1, the control logic is configured such that now the second electronic control unit ECU2 deenergizes the second valve device 16, for example, in the form of the 2/2-way solenoid valve 16*a* of FIG. 2, in order to connect the pneumatic control input 22 of the relay valve of the parking brake control device EPB to the second pressure sink 42, whereby the pneumatic control input 22 of the relay valve RV and thus also its working output 24 and also the working fitting 26 are deaerated, whereby the spring-type brake cylinders 8 of the tractor vehicle are applied.

It is thus clear that the two electronic control units ECU1 and ECU2 energize the second valve device 16 in terms of an "OR" circuit, i.e., each of the two electronic control units ECU1 or ECU2 can separately energize the second 2/2-way solenoid valve 16*a* in order to induce or hold its blocking position.

Since furthermore the parking brake control unit EPB-ECU is defective, neither the third valve device 28 nor the fourth valve device 36 can be energized, so that, on the one hand, the spring-type brake cylinders 8 remain connected to the deaerated working fitting 26 and, on the other hand, also to the pneumatic control input 68 of the trailer control module TCM, whereby the trailer brakes are also applied.

In a chronologically reversed manner, in the case of the second malfunction, the first electronic control unit ECU1' can also fail first and then the electronic parking brake control unit EPB-ECU in chronological succession, wherein then the consequences are the same as described above.

According to one refinement, fourth means can be provided for detecting a failure of the first electrical energy accumulator 52 and/or the second electrical energy accumulator 54, which then consist, for example, of the first electrical energy accumulator 52 and/or the second electrical energy accumulator 54 no longer being able to supply electric current and deenergization necessarily accompanying this of the respective connected consumer representing an error signal or malfunction signal of these fourth means. Therefore, the fourth means are formed here, for example, by the first electrical energy accumulator 52 and/or the second electrical energy accumulator 54 themselves.

In a further case, for example, the control logic, which receives signals from the fourth means, can then be configured in such a way that in the context of a third malfunction, it detects a failure of one single electrical energy source 52 or 54 or both electrical energy sources 52, 54 independent of one another. The vehicle can then still continue its travel with initially only one failed electrical energy source 52 or 54 and can also brake automatically or initiated by the driver using a service brake circuit.

The electronic parking brake control unit EPB-ECU is then controlled by the control logic in such a way that it controls the first valve device 10, for example, in the form of the inlet/outlet valve combination 11 (inlet valve in blocking position, outlet valve in passage position) to deaerate the working output 24 of the relay valve RV, which should actually result in application of the spring-type brake cylinders 8.

However, application of the spring-type brake cylinders 8 is (still) prevented by means of energization of the third valve device 28, for example, in the form of the 3/2-way solenoid valve 28*a* or 28*b* according to FIG. 3*a* or FIG. 3*b*, by the electronic parking brake control unit EPB-ECU wherein the energized 3/2-way solenoid valve 28*a* or 28*b* blocks the working output 24 of the relay valve RV with respect to the working fitting 24 and thus with respect to the spring-type brake cylinders 8 and connects the latter to the compressed air supply 6 and thus aerates them, whereby they cannot (yet) be applied. Finally, the parking brake is thus prepared for the case that the other electrical energy source 52 or 54 also fails.

Furthermore, the control logic may then be configured such that it controls the electronic parking brake control unit EPB-ECU in such a way that the fourth valve device 36 is energized, for example, in the form of the test solenoid valve. This causes the pneumatic control input 68 of the trailer control module TCM to be aerated by connection to the compressed air supply 6, which, against the background of the typical pneumatic inversion of the pressure relationships within such a trailer control module TCM, means that the trailer brakes are deaerated and thus the application thereof is also (initially) prevented.

The third malfunction relates, for example, to a failure of one of the two electrical energy sources 52 or 54 as described above, and in chronological succession thereto a failure of the other electrical energy source 52 or 54 as well.

If, in a refinement of the third malfunction, after some time the other remaining electrical energy source 52 or 54 of the only two energy sources 52, 54 independent from one another should also fail, the electropneumatic parking brake control device EPB or the electronic parking brake control unit PBM-ECU and also the third valve device 28 and also the fourth valve device 36 are thus necessarily deenergized, whereupon the deenergized 3/2-way solenoid valve 28a as the third valve device 28 according to FIG. 3a or FIG. 3b connects the spring-type brake cylinders 8 to the working output 24 of the relay valve RV, whereupon the spring-type brake cylinders 8 are deaerated and the parking brake of the tractor vehicle is thus automatically applied.

Because at the same time the test solenoid valve 36, as an example of the fourth valve device, is also deenergized, the pneumatic control input 68 of the trailer control valve TCM is deaerated and, due to the pneumatic inversion within the trailer control module TCM, the trailer brakes are aerated and are thus also automatically applied.

Therefore, both the spring-type brake cylinders 8 of the tractor vehicle and also the trailer brakes of the trailer are automatically applied in the event of a (successive or simultaneous) failure of both electrical energy supplies 52, 54, and without the driver or the autopilot device being able to override or influence this.

In the further embodiments described hereinafter, the same reference signs are used for identical and equivalently acting components and assemblies as in the above-described embodiment.

Figure 1B:
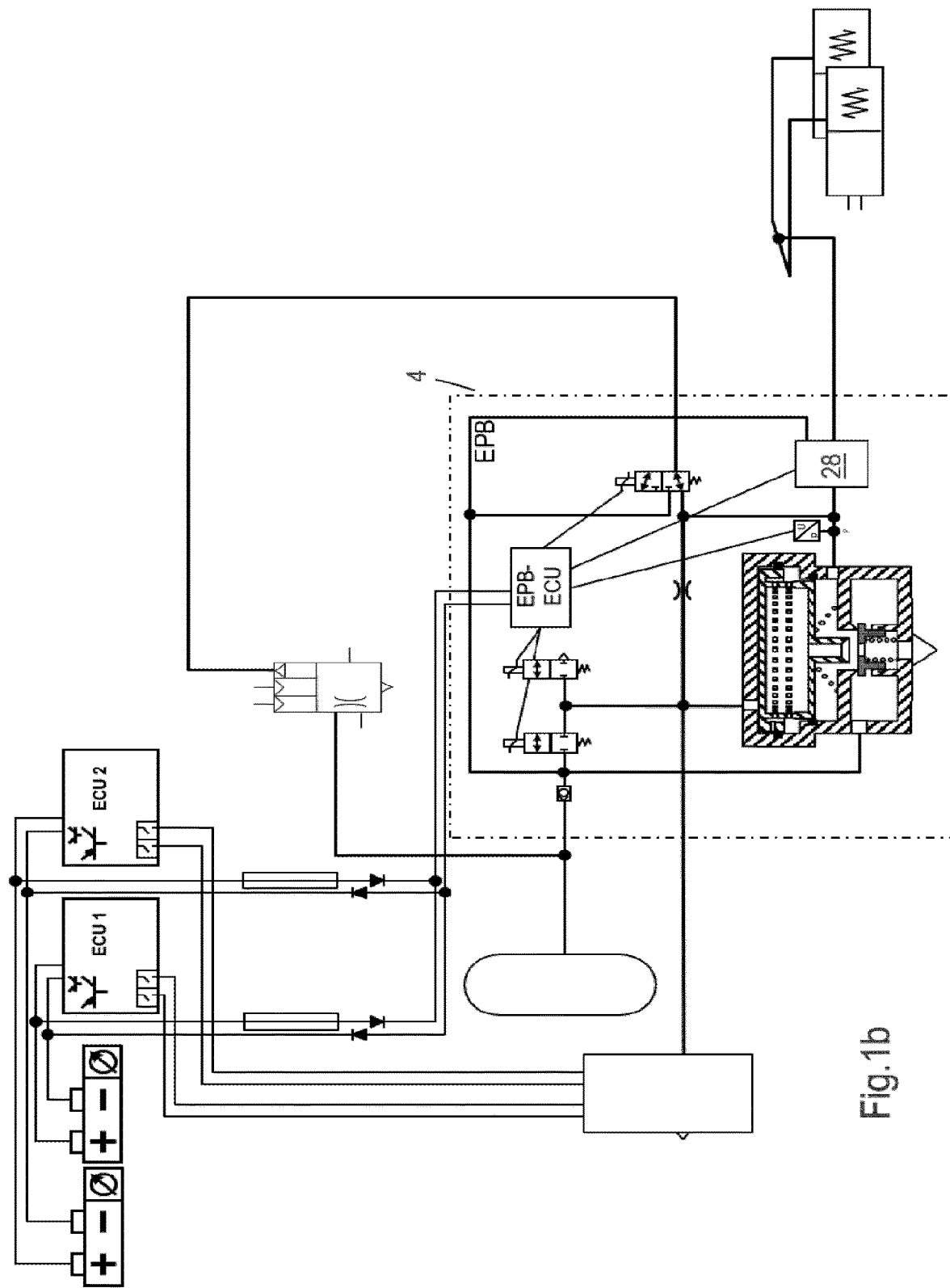
FIG. 1b shows a schematic circuit diagram of a further embodiment of electropneumatic equipment of a vehicle according to the invention.

In contrast to the embodiment of FIG. 1a, in the embodiment of FIG. 1b, the third valve device 28 is integrated into the housing of the electropneumatic parking brake control device, whereby lines or pipes are saved. Otherwise, the structure and functionalities are as already described with respect to the embodiment of FIG. 1a.

Figure 4A:
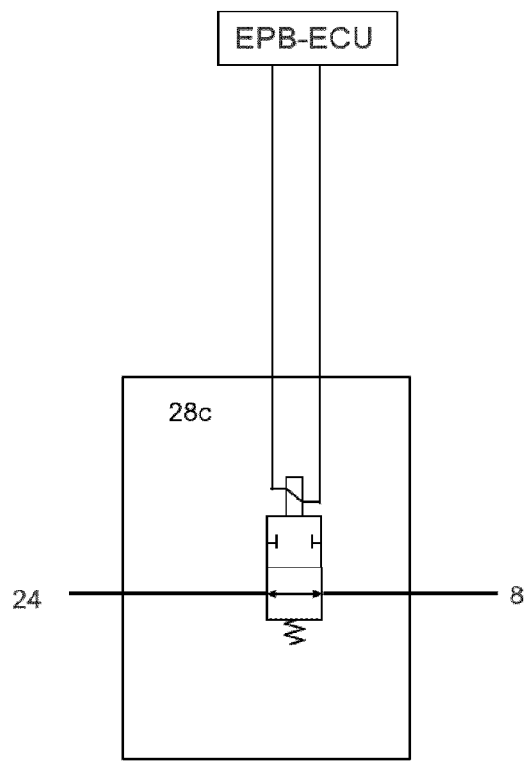
FIG. 4a shows a schematic circuit diagram of an exemplary embodiment of a third valve device of electropneumatic equipment according to the invention.
Figure 4B:
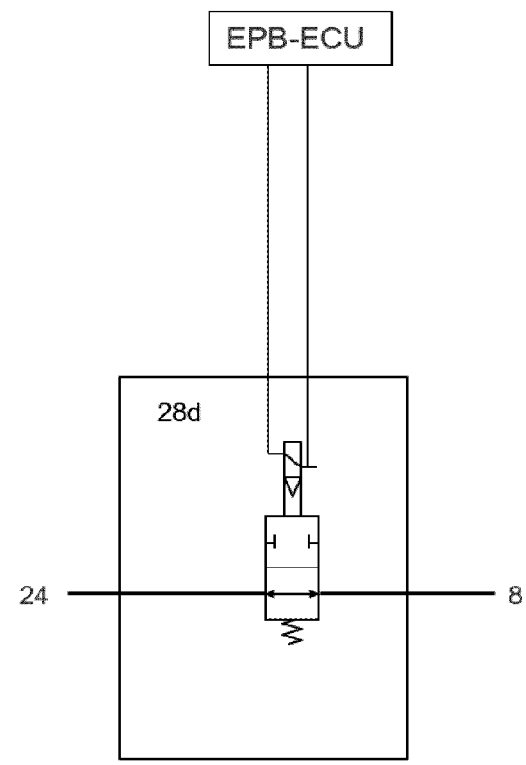
FIG. 4b shows a schematic circuit diagram of a further embodiment of a third valve device of electropneumatic equipment according to the invention.

FIG. 4a and FIG. 4b show a further embodiment of a third valve device 28, which is then embodied, for example, as a 2/2-way solenoid valve 28c (FIG. 4a) or as an electrically pilot controlled 2/2-way valve 28d, wherein the electric control is performed in each case as in the embodiment of FIG. 1a or FIG. 1b by the electronic parking brake control unit PBM-ECU. In contrast to the 3/2-way solenoid valve 28a or the electrically pilot controlled 3/2-way valve 28b of FIG. 3a and FIG. 3b, these 2/2-way valves 28c, 28d cannot connect the spring-type brake cylinders 8 to the compressed air supply 6, but rather can solely block the connection between the working outlet 24 and the spring-type brake cylinders 8 and thus prevent their deaeration, which is sufficient for this desired function, however.

Figure 5:
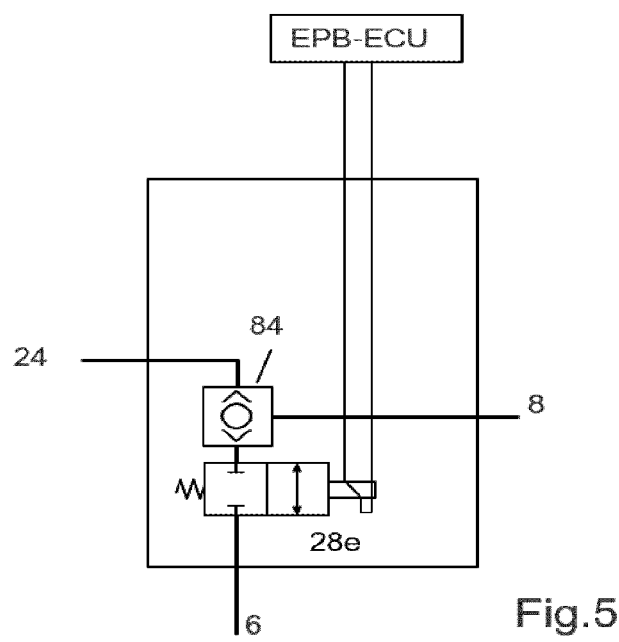
FIG. 5 shows a schematic circuit diagram of a further embodiment of a third valve device of electropneumatic equipment according to the invention.

FIG. 5 shows a schematic circuit diagram of a further embodiment of a third valve device 28 made of a select high valve 84 combined with a 2/2-way valve 28e. In this case, an input fitting of the select high valve 84 is connected to the working fitting 24 and a further input fitting is connected to the 2/2-way valve 28e, the further fitting of which is connected to the compressed air supply 6. An output fitting of the select high valve 84 is connected to the spring-type brake cylinder 8. In the select high valve 84, the greater of the pressure applied at its input fittings, i.e., either the pressure at the working fitting 24 or the pressure set by the 2/2-way valve 28e at the output fitting is controlled further at the output fitting, i.e., at the spring-type brake cylinders 8. In this case, the 2/2-way valve 28e, in its passage position, switches the supply pressure in the compressed air supply at the further input fitting of the select high valve 84 or blocks this connection in its blocking position.

Using this further embodiment of a third valve device, already applied spring-type brake cylinders 8 can be released again, in that they are connected to the compressed air supply 6 via the 2/2-way solenoid valve switched into the passage position.

Figure 6:
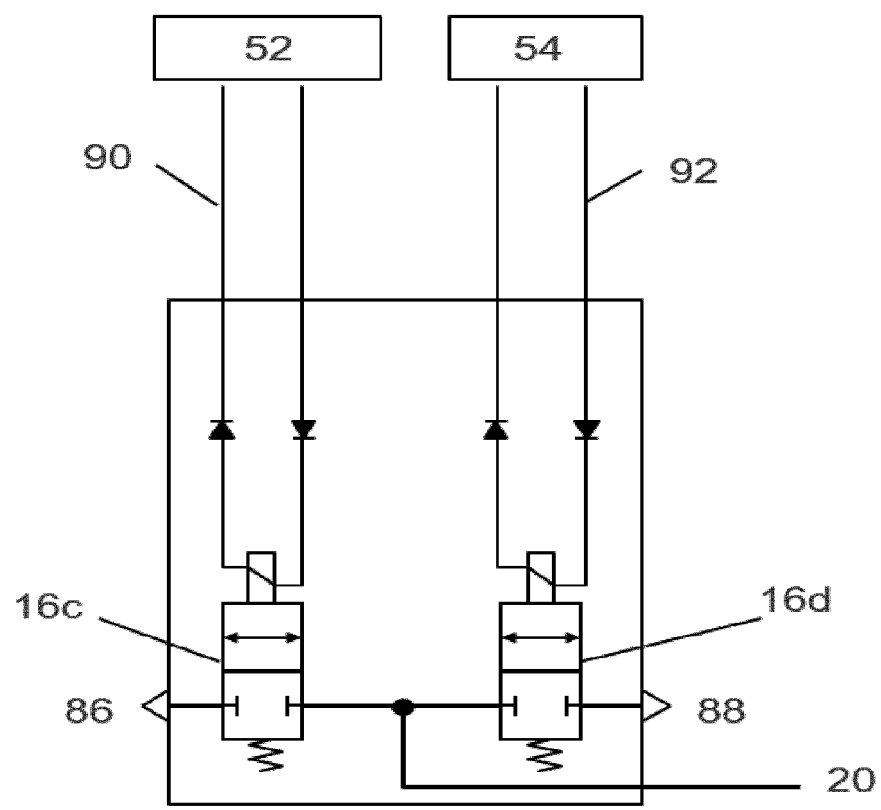
FIG. 6 shows a schematic circuit diagram of a further embodiment of a second valve device of electropneumatic equipment according to the invention.

FIG. 6 shows a schematic circuit diagram of a further embodiment of a second valve device 16, which consists here, for example, of two 2/2-way solenoid valves 16c, 16d, each embodied as "normally open" solenoid valves, wherein each of the valves 16c, 16d is connected, on the one hand, to a third pressure sink 86 and fourth pressure sink 88 and, on the other hand, to the pneumatic control fitting 20 and thus to the pneumatic control input 22 of the relay valve RV. In this case, one such 2/2-way solenoid valve 16c, 16d is continuously energized by in each case a different one of the electrical energy sources 52 or 54 through electrical supply lines 90, 92 and is thus in its blocking position. Therefore, both 2/2-way solenoid valves 16c, 16d are in the blocking position in the starting state, in which no connection is established between the pneumatic control fitting 20 of the electropneumatic parking brake control device EPB or the pneumatic control input 22 of the relay valve RV and the third and fourth pressure sinks 86, 88 of the two 2/2-way solenoid valves 16c, 16d.

The two 2/2-way solenoid valves 16c, 16d are interconnected in such a way that when only one of the two 2/2-way solenoid valves 16c or 16d is deenergized, for example, due to a failure of the electrical energy source 52 or 54 which supplies electric current to this 2/2-way solenoid valve 16c or 16d, a connection is established between the control fitting 20 of the electropneumatic parking brake control device EPB or the pneumatic control input 22 of the relay valve RV and the relevant third or fourth pressure sink 86 or 88. Therefore, in this embodiment it is already sufficient for only one of the electrical energy sources 52 or 54 to fail in order to effectuate automatic application of the spring-type brake cylinders 8. Then, for example, the third valve device 28 and the fourth valve device 36 can be omitted. An activation of the two 2/2-way solenoid valves 16c, 16d by the two electronic control units ECU1 and ECU2 is therefore not provided here. An "OR" circuit is logically provided here with regard to a failure of the electrical energy supplies 52, 54.

Figure 7:
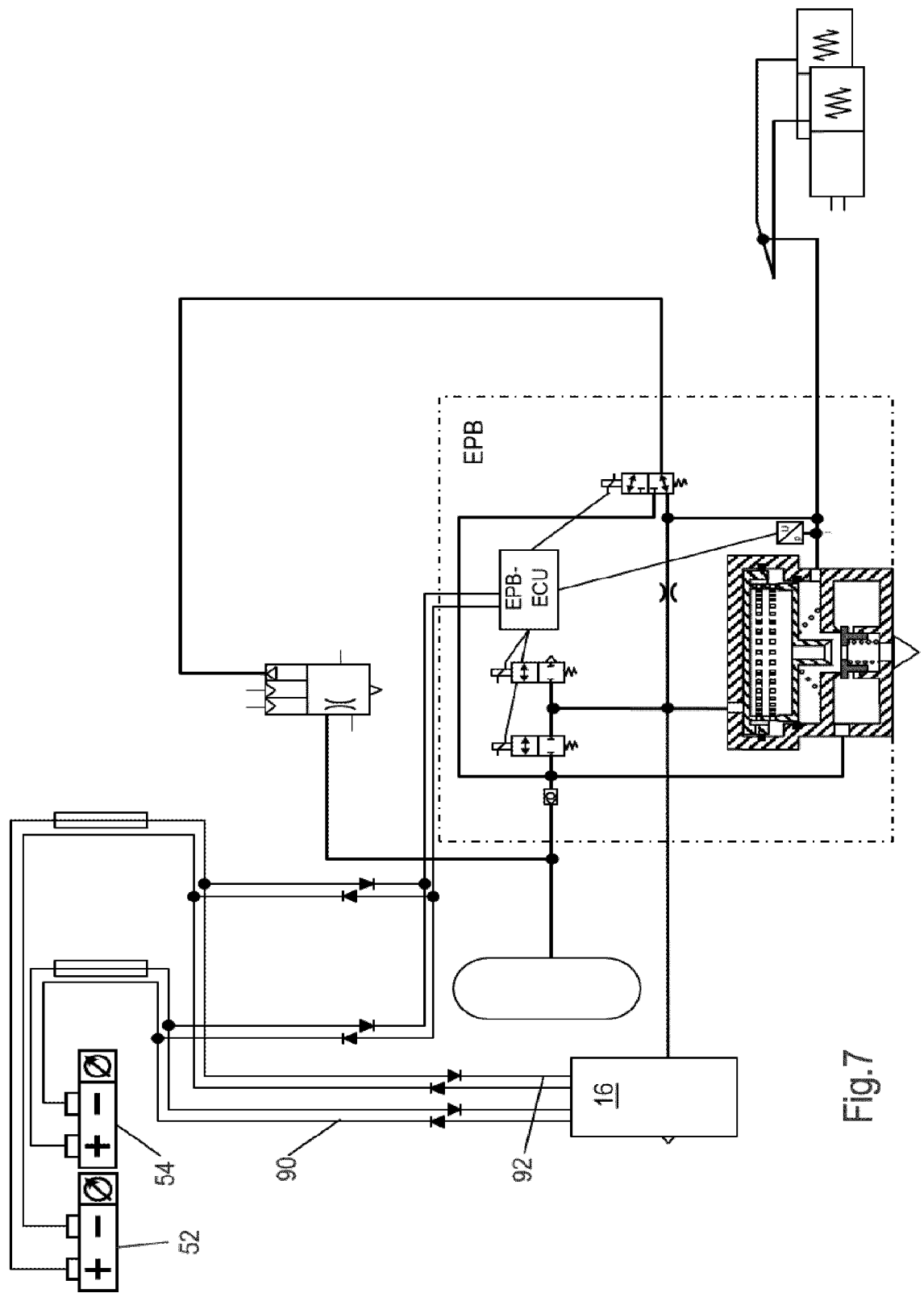
FIG. 7 shows a schematic circuit diagram of a further embodiment of electropneumatic equipment of a vehicle according to the invention.

The embodiment of a second valve device according to FIG. 6 can be used, for example, in the embodiment of the electropneumatic equipment of FIG. 7, in which the second valve device 16 is also permanently energized in each case by both electrical energy sources 52, 54, but an activation of the second valve device 16 by the two electronic control units ECU1 and ECU2 is not provided.

Figure 8:
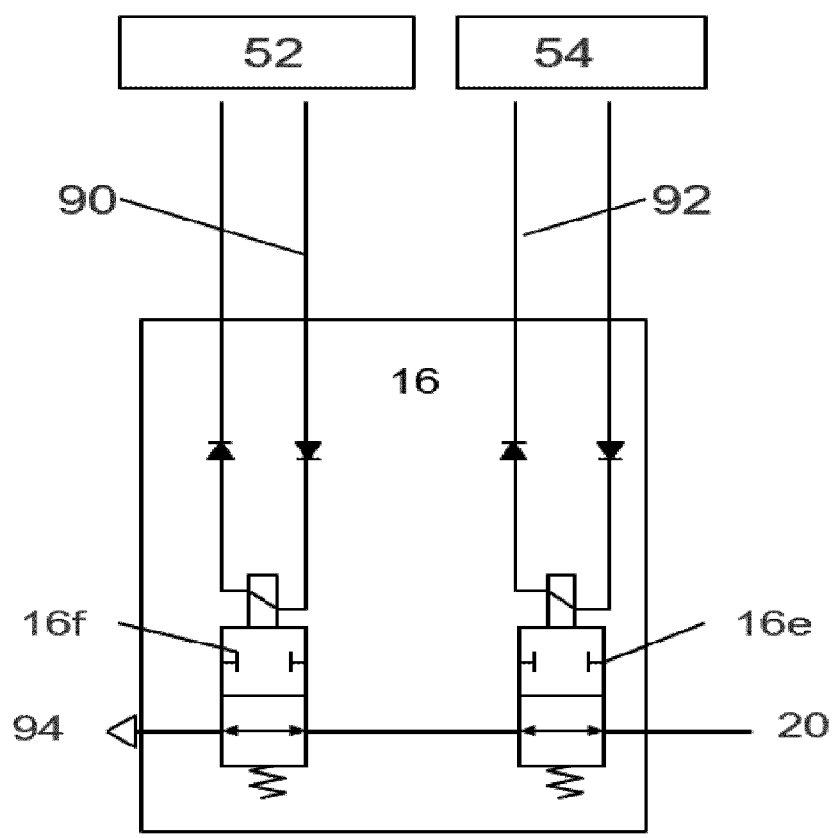
FIG. 8 shows a schematic circuit diagram of a further embodiment of a second valve device of electropneumatic equipment according to the invention.

Alternatively, the second valve device 16 in general or in FIG. 7 can also be embodied as shown in FIG. 8 and then again comprises two 2/2-way solenoid valves 16e, 16f, again each embodied as a "normally open" solenoid valve. The two 2/2-way solenoid valves 16e, 16f are again permanently energized by one electrical energy source 52, 54 in each case by means of electrical supply lines 90, 92 and are then each in the blocking position. However, they are now interconnected in such a way that they only establish a connection between the control fitting 20 of the electropneumatic parking brake control device EPB and/or the pneumatic control input 22 of the relay valve RV and a fifth pressure sink 94 when both 2/2-way solenoid valves 16e, 16f are deenergized. The control fitting 20 of the electropneumatic parking brake control device EPB or the pneumatic control fitting 22 of the relay valve RV is connected here to a fitting of a first 2/2-way solenoid valve 16e, the other fitting of the first 2/2-way solenoid valve 16e is connected to a fitting of the second 2/2-way solenoid valve 16f, to the other fitting of which the fifth pressure sink 94 is connected. Therefore, if only one of the two electrical energy sources 52 or 54 fails here, so that only one of the two 2/2-way solenoid valves 16e or 16f switches into the passage position, this is thus not sufficient to switch through the flow path between the fifth pressure sink 94 and the pneumatic control fitting 20. Both 2/2-way solenoid valves 16e and 16f are only deenergized when both electrical energy sources 52 and 54 fail, whereby both 2/2-way solenoid valves 16e and 16f switch into the passage position, deaerate the control fitting 20 of the electropneumatic parking brake control device EPB, and the spring-type brake cylinders 8 are thus automatically applied. An "AND" circuit is logically provided here with regard to a failure of the electrical energy supplies 52, 54.

Figure 9:
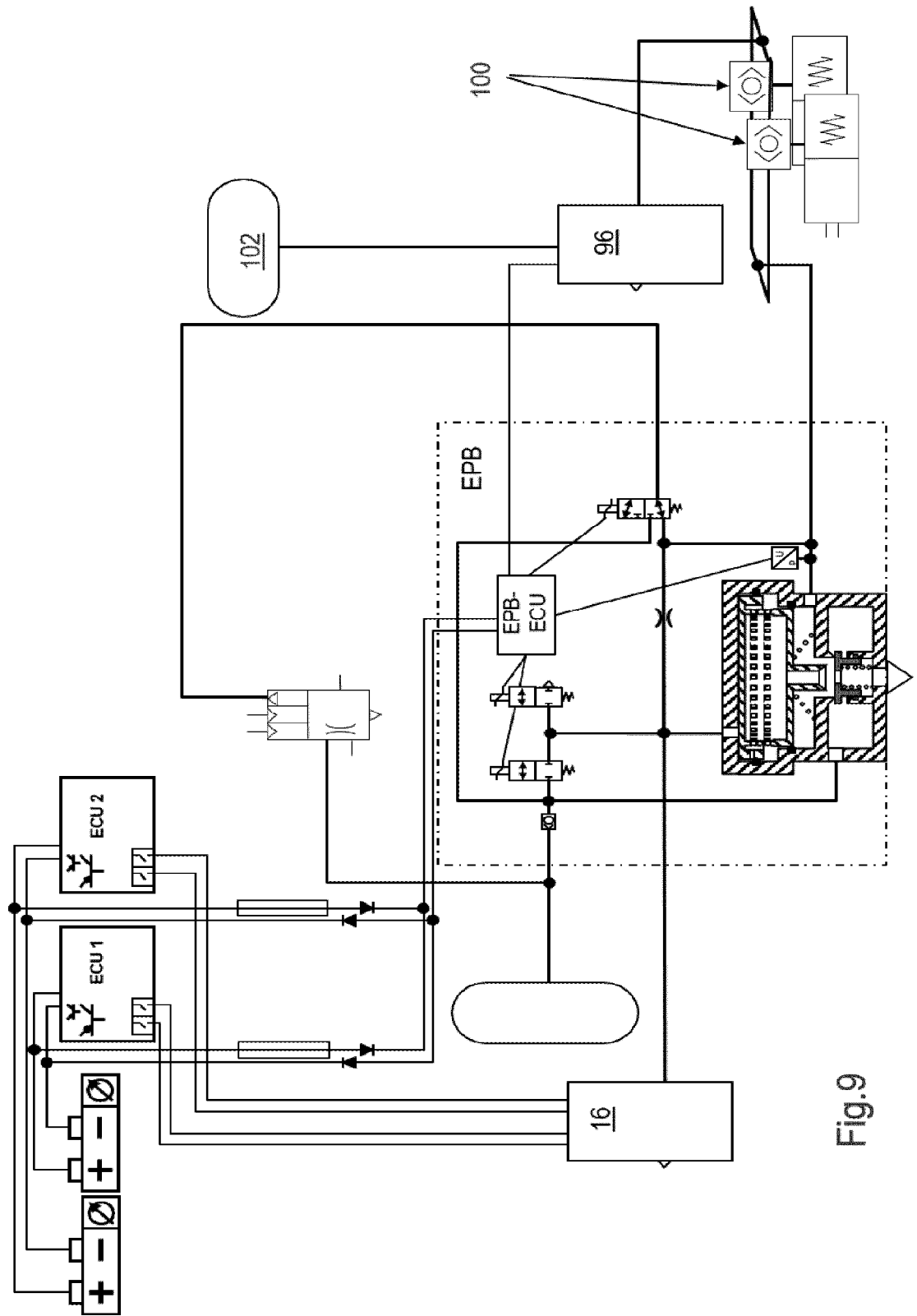
FIG. 9 shows a schematic circuit diagram of a further embodiment of electropneumatic equipment of a vehicle according to the invention.
Figure 10A:
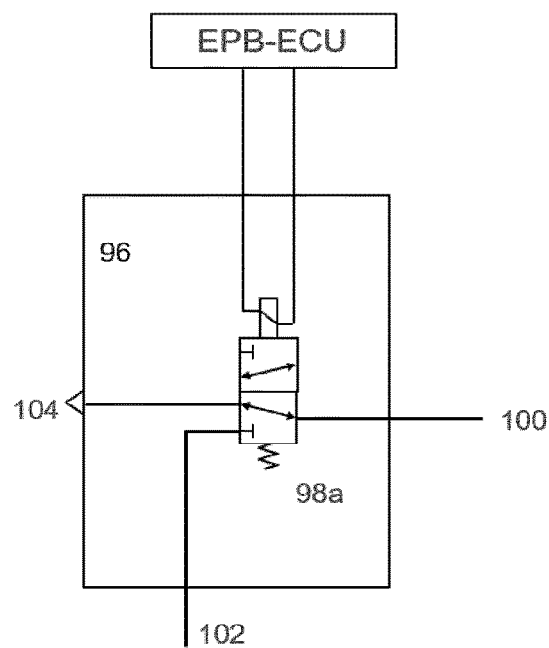
FIG. 10a shows a schematic circuit diagram of a further embodiment of a third valve device of electropneumatic equipment according to the invention.
Figure 10B:
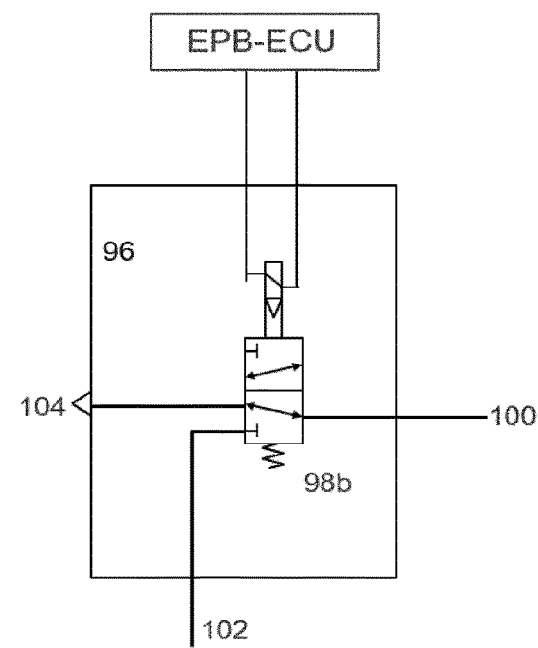
FIG. 10b shows a schematic circuit diagram of a further embodiment of a third valve device according to the invention.

The embodiment of FIG. 9 differs from the embodiment of FIG. 1a solely in that a so-called excess flow shutoff valve 96 is used to simulate the function of the third valve device 28. In some vehicles, such an excess flow shutoff valve 96 is already provided, which is supposed to prevent the spring-type brake cylinders 8 from automatically being applied in the event of a broken compressed air line to the spring-type brake cylinder 8, which could result in undesired locking of the wheels. This excess flow shutoff valve 96 may consist of a 3/2-way solenoid valve 98a or 98b (FIG. 10a, FIG. 10b) controlled by the electronic parking brake control unit EPB-ECU, which acts by means of select high valves 100 (FIG. 9) at the input of the spring-type brake cylinders 8 in parallel on the spring-type brake cylinders 8 and can then supply them with supply pressure, for example, from a further independent compressed air supply 102. Furthermore, the excess flow shutoff valve 96 also has a sixth pressure sink 104 for deaerating the spring-type brake cylinder 8.

Such an excess flow shutoff valve 96, which is already provided anyway in some cases, can thus replace the third valve device 28.

Figure 11:
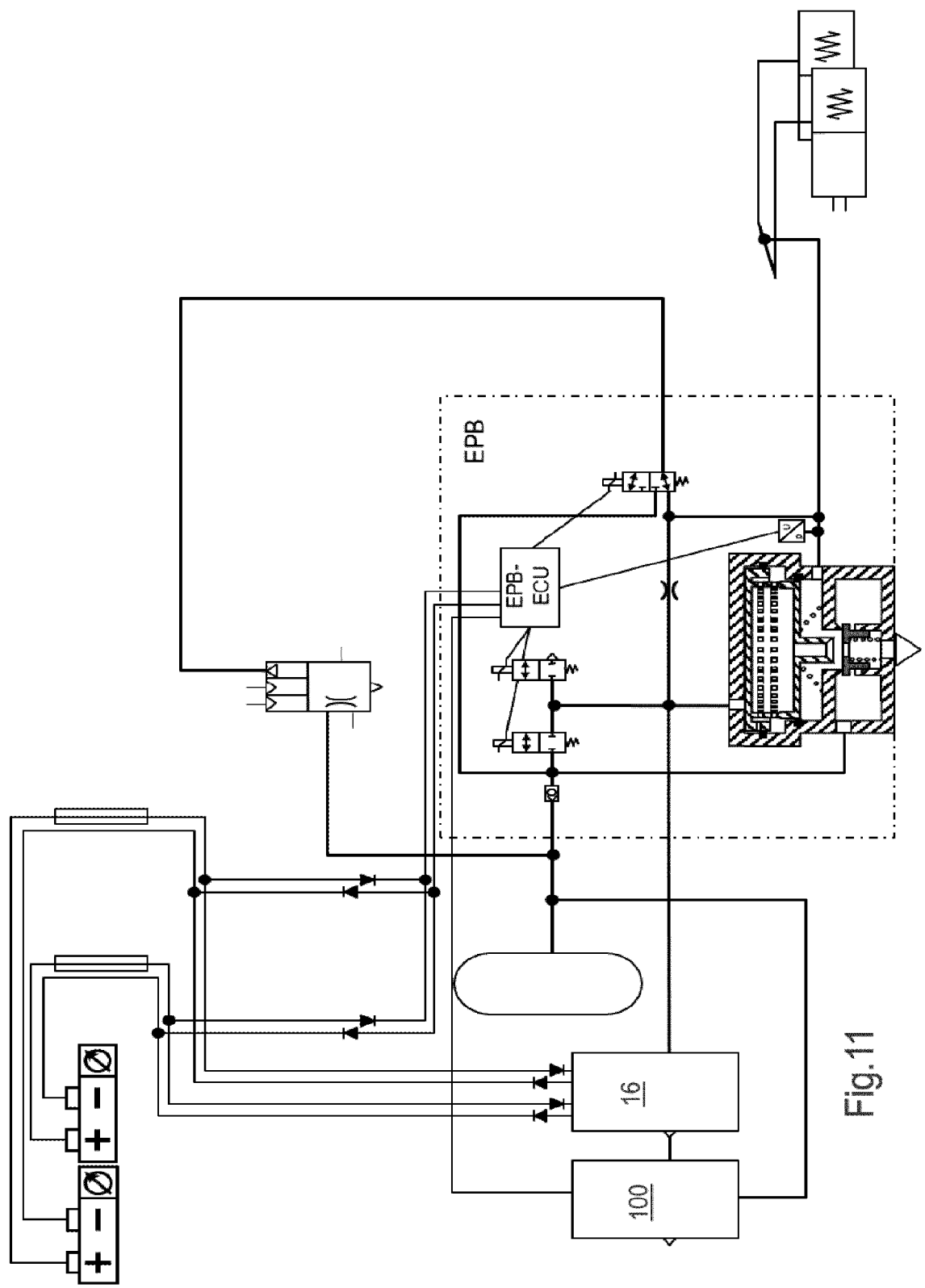
FIG. 11 shows a schematic circuit diagram of a further embodiment of electropneumatic equipment of a vehicle according to the invention.
Figure 12:
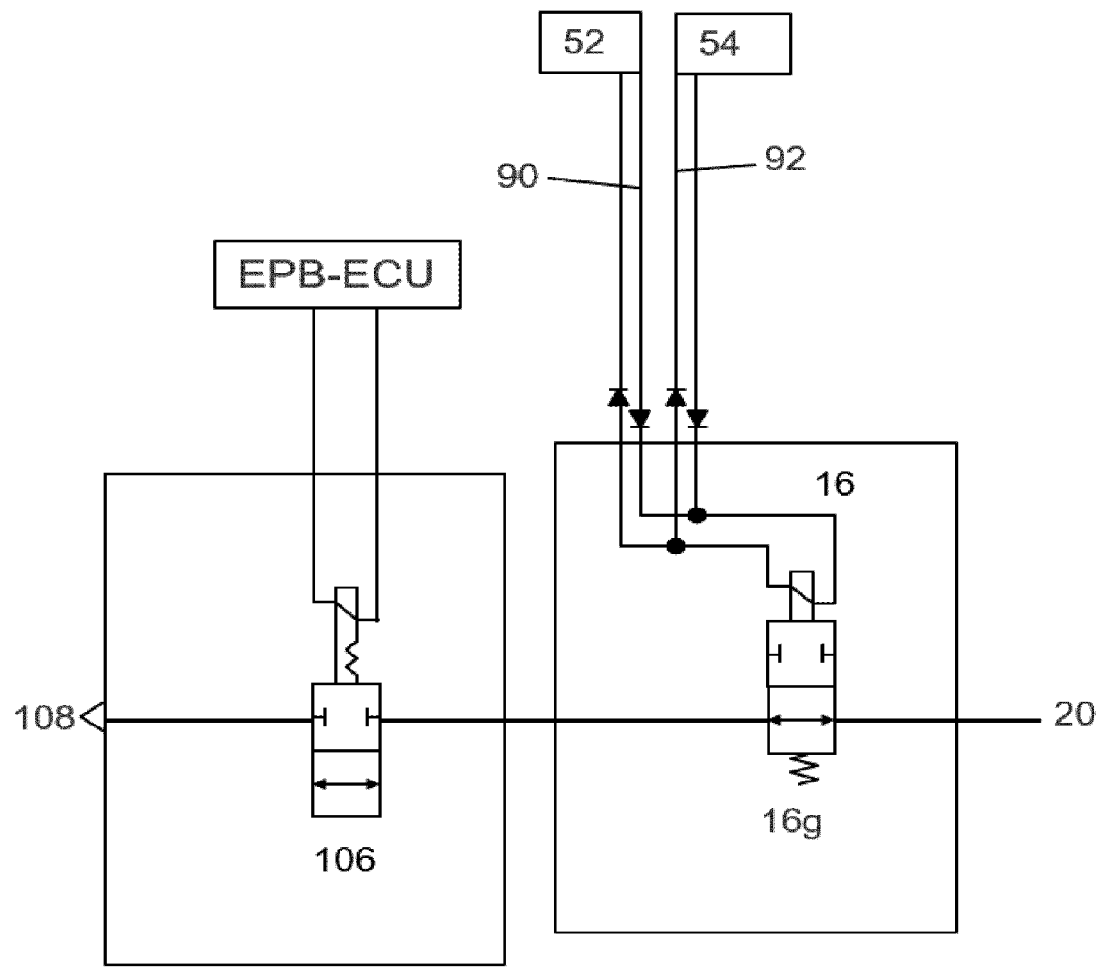
FIG. 12 shows a schematic circuit diagram of a further embodiment of a second valve device according to the invention having a bistable valve.

In the embodiment of FIG. 11, the second valve device 16, for example, in the form of a 2/2-way solenoid valve 16g, which is embodied as a "normally open" valve, is supplemented by a bistable valve 106, as shown in FIG. 12. In this case, the one fitting of the 2/2-way solenoid valve 16g is connected to the pneumatic control fitting 20 of the electropneumatic parking brake control device EPB or to the pneumatic control input 22 of the relay valve RV and the other fitting is connected to the one fitting of the bistable valve 106, the other fitting of which is in turn connected to a seventh pressure sink 108. The 2/2-way solenoid valve 16g is permanently energized via supply lines 90, 92 by both separate electrical energy sources 52, 54, because of which it is in the blocking position in the starting state. The 2/2-way solenoid valve 16d is only deenergized when both electrical energy sources 52 and 54 fail and then switches into its passage position.

The bistable valve 106 is controlled by the electronic parking brake control unit EPB-ECU. The control logic of the electronic parking brake control unit EPB-ECU can then decide whether the parking brake is to be automatically engaged in the event of a power failure. The bistability can be implemented, for example, via a fed-back booster valve, which switches in the direction of closed when depressurized. The third valve device 28 and the fourth valve device 36 can then be omitted.

All above-described embodiments can be combined with one another without thus restricting the scope of protection of the patent claims.

The List of reference signs is as follows:
EPB electropneumatic parking brake control device
EPB-ECU electronic parking brake control unit
RV relay valve
ECU1 first electronic control unit
ECU2 second electronic control unit
iFBM foot brake module
1 electropneumatic equipment
2 electropneumatic parking brake device
4 housing
6 compressed air supply
8 spring-type brake cylinder
10 first valve device
11 inlet/outlet valve combination
12 supply line
14 supply fitting
16 second valve device
16 a/c/d 2/2-way solenoid valves
16 e/f/g 2/2-way solenoid valves
18 pneumatic control line
20 pneumatic control fitting
22 pneumatic control input
24 working output
26 working fitting
28 third valve device
28 a/b 3/2-way solenoid valve
28 c/d/e 3/2-way solenoid valve
30 brake line
32 feedback connection
34 throttle element
36 fourth valve device
38 supply connection
40 first pressure sink
42 second pressure sink
44 parking brake actuating device
46 parking brake actuating element
48 signal line
50 signal fitting
52 first electrical energy source
54 second electrical energy source
56 electrical supply lines
58 electrical control lines
60 circuit disconnection diodes
62 fuses
64 trailer fitting
66 pneumatic line
68 pneumatic control input
70 working output
72 supply line
74 control line
76 control line
78 pressure sensor
80 brake pedal
82 solenoid valve device
84 select high valve
86 third pressure sink
88 fourth pressure sink
90 electrical supply lines
92 electrical supply lines
94 fifth pressure sink
96 excess flow shutoff valve
98 a/b 3/2-way solenoid valve
100 select high valve
102 further compressed air supply
104 sixth pressure sink
106 bistable valve
108 seventh pressure sink

The invention claimed is:
1. An electropneumatic equipment of a vehicle, comprising:
   a) an electropneumatic parking brake device having an electropneumatic parking brake control device, at least one compressed air supply and at least one pneumatic spring-type brake cylinder, wherein
   b) the electropneumatic parking brake control device has an electronic parking brake control unit, a first valve device comprising at least one first solenoid valve and at least one valve pressure controlled thereby, in which the at least one first solenoid valve is controlled by the electronic parking brake control unit, wherein
   c) a pneumatic control input of the pressure-controlled valve is connected to the at least one first solenoid valve and a working output of the pressure-controlled valve can be connected to the at least one spring-type brake cylinder, wherein
   d) the at least one first solenoid valve is furthermore connected to the at least one compressed air supply and to a pressure sink, wherein
   e) the at least one first solenoid valve is configured such that in dependence on the control by the electronic parking brake control unit, it connects the pneumatic control input of the pressure-controlled valve to the at least one compressed air supply or to the pressure sink, wherein
   f) the pressure-controlled valve is configured such that in the event of deaeration of its pneumatic control input, it deaerates its working output and in the event of aeration of its pneumatic control input, it aerates its working output, and including
   g) a second valve device having at least one second solenoid valve, which is connected to the pneumatic control input of the pressure-controlled valve of the first valve device and is configured such that in dependence on energizing or deenergizing of the at least one second solenoid valve, it connects the pneumatic control input of the pressure-controlled valve to a further pressure sink or blocks such a connection,
   wherein:
   h) the electropneumatic parking brake control device is supplied with electrical energy by only two electrical energy sources independent of one another, a first electrical energy source and a second electrical energy source, and in that
   i) the at least one second solenoid valve of the second valve device can be energized or deenergized by only the two electrical energy sources independent of one another or by two electronic control units independent of one another, of which a first electronic control unit and a second electronic control unit is supplied with electrical energy by a respective other electrical energy source of the only two electrical energy sources independent of one another.

2. The electropneumatic equipment of claim 1, wherein the only two electrical energy sources independent of one another each supply one electronic control unit with electrical energy, namely a first electrical energy source supplies the first electronic control unit and a second electrical energy source the second electronic control unit.

3. The electropneumatic equipment of claim 1, wherein the first electronic control unit and the second electronic control unit are configured such that a failure of one of the control units does not influence the function of the respective other control unit.

4. The electropneumatic equipment of claim 1, further comprising:
   a) first means for detecting a failure of the electronic parking brake control unit and
   b) second means for detecting a travel state of the vehicle with respect to travel or standstill are provided, wherein the first means and the second means are supplied with electrical energy by at least one electrical energy source of the two energy sources independent of one another, and
   c) a control logic implemented in at least one electronic control unit, which receives signals from the first means and the second means and which is configured so that
   d) in the event of a detected standstill of the vehicle and in the event of a detected failure of the electronic parking brake control unit, it controls the first electronic control unit and/or the second electronic control unit such that it/they control(s) the at least one second solenoid valve of the second valve device to connect the pneumatic control input of the pressure-controlled valve of the parking brake control device to the further pressure sink.

5. The electropneumatic equipment of any one of claim 4, wherein the control logic is implemented in each case in the electronic parking brake control unit, the first electronic control unit, and the second electronic control unit.

6. The electropneumatic equipment of any one of claim 4, further comprising:
   a) the first means for detecting a failure of the electronic parking brake control unit, and/or
   b) a third means for detecting a failure of the first electronic control unit and/or the second electronic control unit, and/or
   c) a fourth means for detecting a failure of the first electrical energy source and/or the second electrical energy source,
   include a detection by self-monitoring or a detection by external monitoring.

7. The electropneumatic equipment of claim 1, further comprising:
   a) first means for detecting a failure of the electronic parking brake control unit, and
   b) second means for detecting a travel state of the vehicle with respect to travel or standstill, and
   c) third means for detecting a failure of the first electronic control unit and/or the second electronic control unit are provided, wherein the first means, the second means, and the third means are supplied with electrical energy by at least one electrical energy source of the two energy sources independent of one another, and
   d) a control logic implemented in at least one electronic control unit supplied with electrical energy by at least one electrical energy source of the two energy sources independent of one another, which receives signals from the first means, from the second means, and from the third means and which is configured so that
   e) in the event of a detected standstill of the vehicle and in the event of a detected failure of the first electronic control unit or the second electronic control unit, on the one hand, and the electronic parking brake control unit, on the other hand, it controls the respective intact remaining electronic control unit of the two electronic control units so that this intact remaining electronic control unit controls the at least one second solenoid valve of the second valve device to connect the pneumatic control input of the pressure-controlled valve to the further pressure sink.

8. The electropneumatic equipment of claim 1, wherein a third valve device, having at least one third solenoid valve controlled by the electronic parking brake control unit, is provided, which is connected to the working output of the pressure-controlled valve, to at least one compressed air supply, and to the at least one spring-type brake cylinder and is configured such that in the event of deenergization of the at least one third solenoid valve by the electronic parking brake control unit, it connects the at least one spring-type brake cylinder to the working output of the pressure-controlled valve and in the event of energization of the at least one third solenoid valve by the electronic parking brake control unit, it blocks such a connection and then connects the at least one spring-type brake cylinder to the at least one compressed air supply or blocks the pressure in the at least one spring-type brake cylinder.

9. The electropneumatic equipment of claim 8, wherein the at least one third solenoid valve and/or the at least one fourth solenoid valve are each formed by one of the following valves or include such a valve:
   a) a 3/2-way solenoid valve,
   b) a 2/2-way solenoid valve,
   c) a combination of a 2/2-way solenoid valve and a select high valve,
   d) an excess flow shutoff valve.

10. The electropneumatic equipment of claim 8, further comprising:
   a) fourth means for detecting a failure of the first electrical energy source and/or the second electrical energy source are provided, and
   b) a control logic implemented in at least one electronic control unit supplied with electrical energy by at least one electrical energy source of the two energy sources independent of one another, which receives signals from the fourth means and which is configured so that
   c) in the event of a detected failure of a single electrical energy source of the two electrical energy sources independent of one another, it controls the electronic parking brake control unit so that the at least one third solenoid valve of the third valve device is energized.

11. The electropneumatic equipment of claim 10, wherein the control logic is configured such that in the event of a detected failure of a single electrical energy source of the two electrical energy sources independent of one another, it controls the electronic parking brake control unit so that at least one fourth solenoid valve of a fourth valve device is energized.

12. The electropneumatic equipment of claim 10, wherein, in the event of a failure of a further energy source of the only two energy sources independent of one another, the electronic parking brake control unit and the at least one third solenoid valve of the third valve device are deenergized, whereupon the at least one third solenoid valve of the third valve device connects the at least one spring-type brake cylinder to the working output of the pressure-controlled valve.

13. The electropneumatic equipment of claim 12, wherein the control logic is configured such that in the event of a failure of a further electrical energy source of the only two energy sources independent of one another, at least one fourth solenoid valve of a the fourth valve device is deenergized.

14. The electropneumatic equipment of claim 1, wherein a fourth valve device, having at least one fourth solenoid valve controlled by the electronic parking brake control unit, is provided, which is connected to a pneumatic control fitting of an electropneumatic trailer control module, to the at least one compressed air supply, and to the working output of the pressure-controlled valve and is configured such that in the event of deenergization of the at least one fourth solenoid valve by the electronic parking brake control unit, it establishes a connection between the pneumatic control fitting of the electropneumatic trailer control module and the working outlet of the pressure-controlled valve and in the event of energization of the at least one fourth solenoid valve, it blocks such a connection and establishes a connection between the at least one compressed air supply and the pneumatic control fitting of the electropneumatic trailer control module.

15. The electropneumatic equipment of claim 14, wherein the electropneumatic trailer control module has a pneumatic fitting for a pneumatic or electropneumatic brake device of a trailer of the vehicle and is configured such that in the event of aeration of the electropneumatic trailer control module pneumatic control fitting, the trailer control module deaerates the pneumatic fitting of the electropneumatic brake device of the trailer and in the event of deaeration of the electropneumatic trailer control module pneumatic control fitting, the trailer control module aerates the pneumatic fitting of the electropneumatic brake device of the trailer.

16. The electropneumatic equipment of claim 14, wherein the at least one fourth solenoid valve is formed by a test solenoid valve, which is provided for a test as to whether a tractor vehicle braked via the at least one spring-type brake cylinder can hold a combination of the tractor vehicle and the trailer at a standstill with the unbraked trailer.

17. The electropneumatic equipment of claim 1, wherein the pressure-controlled valve is formed by a relay valve, which is connected to a supply fitting on the at least one compressed air supply.

18. The electropneumatic equipment of claim 17, wherein a pneumatic feedback connection is drawn between the working output of the relay valve and the pneumatic control input of the relay valve.

19. The electropneumatic equipment of claim 18, wherein at least one pneumatic throttle element is arranged in the pneumatic feedback connection.

20. The electropneumatic equipment of claim 1, wherein the second valve device includes at least one electrically controlled 2/2-way valve, which
   a) when energized, assumes a passage position, in which a first fitting is connected to a second fitting and which, when deenergized, assumes a blocking position, in which this connection is blocked, or which
   b) when deenergized, assumes a passage position, in which a first fitting is connected to a second fitting, and which, when energized, assumes a blocking position, in which this connection is blocked.

21. The electropneumatic equipment of claim 20, wherein the second valve device only includes an electrically controlled 2/2-way valve, of which a first fitting is connected or connectable to the pneumatic control input of the pressure-controlled valve and a second fitting is connected or connectable to the further pressure sink, and which is electrically controlled by the first electronic control unit and independently thereof by the second electronic control unit or by the two electrical energy sources.

22. The electropneumatic equipment of claim 20, wherein the second valve device includes two electrically controlled 2/2-way valves or a single 2/2-way solenoid valve having two coils, wherein a) a first 2/2-way valve or a first coil of the single 2/2-way solenoid valve is energized by the first energy source and a second 2/2-way valve or a second coil of the single 2/2-way solenoid valve is energized by the second energy source, and wherein b) the single 2/2-way solenoid valve or the first 2/2-way valve and the second 2/2-way valve is interconnected with the pneumatic control input of the pressure-controlled valve and to the further pressure sink such that the pneumatic control input of the pressure-controlled valve is only connected or connectable to the further pressure sink in the event of a failure of both electrical energy sources and otherwise, in the event of a failure of only one of the two electrical energy sources independent of one another or in the event of intact electrical energy sources independent of one another, such a connection is blocked.

23. The electropneumatic equipment of claim 20, wherein the second valve device includes at least one electrically controlled 2/2-way valve which, when deenergized, assumes a passage position, in which a first fitting is connected to a second fitting and which, when energized, assumes a blocking position, in which this connection is blocked, wherein furthermore a bistable valve is provided as a 2/2-way solenoid valve controlled by the electronic parking brake control unit, which is energized by the only two electrical energy sources and which is interconnected with the electrically controlled 2/2-way valve such that the pneumatic control input of the pressure-controlled valve is connected to the further pressure sink solely in the event of a failure of both electrical energy sources and otherwise, i.e., in the event of a failure of only one of the two electrical energy sources independent of one another or in the event of both intact electrical energy sources independent of one another, such a connection is blocked.

24. The electropneumatic equipment of claim 1, wherein the at least one first solenoid valve is formed by a combination of two 2/2-way solenoid valves as an inlet/outlet valve combination.

25. The electropneumatic equipment of claim 1, wherein the first electronic control unit and the second electronic control unit are each formed by one of the following electronic control units:

a) an electronic control unit, which controls or regulates an electronically regulated electropneumatic service brake system of the vehicle, b) an electronic control unit, which, on the one hand, represents an evaluation device for signals of a brake value generator of an electropneumatic foot brake module interacting with a brake pedal and which, on the other hand, controls a solenoid valve device, by which a pneumatic control chamber of the electropneumatic foot brake module is aerated or deaerated, using which at least one pneumatic channel of the foot brake module is actuatable, c) an electronic control unit which controls an electrical steering device of the vehicle, d) an electronic control unit which controls a driver assistance system of the vehicle, e) an electronic control unit which controls an autopilot device of the vehicle, using which partially autonomous or autonomous driving is implemented, f) an electronic control unit which controls a compressed air preparation device for compressed air consumers of the vehicle, g) an electronic control unit which controls a pneumatic suspension device of the vehicle, h) an electronic control unit which forms a central vehicle computer of the vehicle.

26. The electropneumatic equipment of claim 1, wherein the at least one electronic parking brake control unit, the first valve device including the at least one first solenoid valve, and the pressure-controlled valve are integrated into a shared housing of the parking brake control device.

27. The electropneumatic equipment of claim 1, wherein the at least one second solenoid valve, at least one third solenoid valve, and/or at least one fourth solenoid valve is integrated into a housing of the parking brake control device or is flanged onto the housing of the parking brake control device.

28. The electropneumatic equipment of claim 1, wherein the first electrical energy source and the second electrical energy source are each decoupled from one another by circuit disconnection diodes and/or by fuses connected in series thereto and/or by relays.

29. The electropneumatic equipment of claim 1, including an electronically regulated electropneumatic service brake system, in which the service brake pressure is regulated to a target value.

30. The electropneumatic equipment of claim 1, wherein the two electrical energy sources each supply one electrical or electropneumatic service brake circuit with electrical energy.

31. A vehicle, comprising:
electropneumatic equipment, including:

a) an electropneumatic parking brake device having an electropneumatic parking brake control device, at least one compressed air supply and at least one pneumatic spring-type brake cylinder, wherein b) the electropneumatic parking brake control device has an electronic parking brake control unit, a first valve device comprising at least one first solenoid valve and at least one valve pressure controlled thereby, in which the at least one first solenoid valve is controlled by the electronic parking brake control unit, wherein c) a pneumatic control input of the pressure-controlled valve is connected to the at least one first solenoid valve and a working output of the pressure-controlled valve can be connected to the at least one spring-type brake cylinder, wherein d) the at least one first solenoid valve is furthermore connected to the at least one compressed air supply and to a pressure sink, wherein e) the at least one first solenoid valve is configured such that in dependence on the control by the electronic parking brake control unit, it connects the pneumatic control input of the pressure-controlled valve to the at least one compressed air supply or to the pressure sink, wherein f) the pressure-controlled valve is configured such that in the event of deaeration of its pneumatic control input, it deaerates its working output and in the event of aeration of its pneumatic control input, it aerates its working output, and including g) a second valve device having at least one second solenoid valve, which is connected to the pneumatic control input of the pressure-controlled valve of the first valve device and is configured such that in dependence on energizing or deenergizing of the at least one second solenoid valve, it connects the pneumatic control input of the pressure-controlled valve to a further pressure sink or blocks such a connection, wherein:

h) the electropneumatic parking brake control device is supplied with electrical energy by only two electrical energy sources independent of one another, a first electrical energy source and a second electrical energy source, and in that i) the at least one second solenoid valve of the second valve device can be energized or deenergized by only the two electrical energy sources independent of one another or by two electronic control units independent of one another, of which a first electronic control unit and a second electronic control unit is supplied with electrical energy by a respective other electrical energy source of the only two electrical energy sources independent of one another.

* * * * *